United States Patent
Odashima

(10) Patent No.: US 12,491,100 B2
(45) Date of Patent: Dec. 9, 2025

(54) BRACE

(71) Applicant: TOYOTA JIDOSHA KABUSHIKI KAISHA, Toyota (JP)

(72) Inventor: Tadashi Odashima, Toyota (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 369 days.

(21) Appl. No.: 18/162,490

(22) Filed: Jan. 31, 2023

(65) Prior Publication Data
US 2023/0329890 A1  Oct. 19, 2023

(30) Foreign Application Priority Data

Apr. 15, 2022  (JP) ................................. 2022-067788

(51) Int. Cl.
*A61F 5/01*  (2006.01)
(52) U.S. Cl.
CPC .......... *A61F 5/0106* (2013.01); *A61F 5/0118* (2013.01); *A61F 5/0123* (2013.01); *A61F 5/013* (2013.01); *A61F 2005/0197* (2013.01)
(58) Field of Classification Search
CPC .... A61F 5/0106; A61F 5/0118; A61F 5/0123; A61F 5/013; A63B 71/1225; A63B 2071/125
See application file for complete search history.

(56) References Cited

U.S. PATENT DOCUMENTS

| | | | |
|---|---|---|---|
| 7,749,183 B2* | 7/2010 | Ingimundarson | A61F 5/0123 2/24 |
| 8,882,689 B2* | 11/2014 | Castillo | A61F 5/0123 602/26 |
| 9,021,614 B2* | 5/2015 | Tepper | A63B 71/1225 2/24 |
| 10,420,668 B2* | 9/2019 | Klutts | A61F 5/0106 |
| 2015/0290014 A1* | 10/2015 | Anglada | A61F 5/0125 602/26 |
| 2019/0209884 A1* | 7/2019 | Buskila | A63B 21/4017 |
| 2022/0249268 A1 | 8/2022 | Kroll-Orywahl et al. | |

FOREIGN PATENT DOCUMENTS

| | | |
|---|---|---|
| CN | 101801317 A | 8/2010 |
| JP | 2010-518895 A | 6/2010 |
| JP | 6588635 B2 | 10/2019 |
| JP | 2020-081716 A | 6/2020 |
| JP | 6886989 B2 | 6/2021 |

(Continued)

*Primary Examiner* — Keri J Nelson
(74) *Attorney, Agent, or Firm* — Oliff PLC

(57) ABSTRACT

The first attaching member is configured to be fixed to a portion on the center side of the body of the joint portion to which the brace is attached. The second attaching member is configured to be fixed to a portion of the joint portion opposite to the center side of the body. The pressing member is configured to press a portion of the joint portion that extends when the joint portion bends. The plurality of tension members is configured to pull and connect the first attaching member, the second attaching member, and the pressing member. Each of the plurality of tension members is arranged such that the amount of change in the length of the tension member when the joint portion is bent and extended is equal to or less than a predetermined threshold value.

7 Claims, 20 Drawing Sheets

(56) References Cited

FOREIGN PATENT DOCUMENTS

| | | |
|---|---|---|
| WO | 2008/101314 A1 | 8/2008 |
| WO | 2009035686 A1 | 3/2009 |
| WO | 2015/017462 A1 | 2/2015 |
| WO | 2015/187961 A1 | 12/2015 |
| WO | 2017/015086 A1 | 1/2017 |
| WO | 2021013828 A1 | 1/2021 |

\* cited by examiner

BRACE

CROSS-REFERENCE TO RELATED APPLICATION

This application claims priority to Japanese Patent Application No. 2022-067788 filed on Apr. 15, 2022, incorporated herein by reference in its entirety.

BACKGROUND

1. Technical Field

The present disclosure relates to a brace, for example, a brace that is attached to a body.

2. Description of Related Art

For example, when a hemiplegic patient or the like performs walking training, a brace is attached to suppress the knee bending of the affected leg. In relation to such a technique, Japanese Patent No. 6886989 (JP 6886989 B) discloses a knee brace. The knee brace according to JP 6886989 B is composed of an upper attaching assembly that is received by the thigh of the patient and a lower attaching assembly that is received by the lower leg of the patient. Each attaching assembly implements a side support and an inner support. Hinges interconnect the side supports of the upper attaching assembly and the lower attaching assembly, and the inner supports of the upper attaching assembly and the lower attaching assembly.

SUMMARY

In the technique according to JP 6886989 B, the upper attaching assembly and the lower attaching assembly are connected via a link structure, such as a hinge, a side support, and an inner support. Since such a link structure has constant weight and size, the adoption of the link structure in the knee brace may increase the weight and size of the knee brace.

The present disclosure provides a brace capable of achieving weight reduction and size reduction.

A brace according to the present disclosure is a brace attached to a body, and includes:
  a first attaching member configured to be fixed to a central portion of the body on a joint portion to which the brace is attached;
  a second attaching member configured to be fixed to a portion opposite to the central portion of the body on the joint portion;
  a pressing member configured to press a portion of the joint portion that extends when the joint portion is bent; and
  a plurality of tension members configured to pull and connect the first attaching member, the second attaching member, and the pressing member.
Each of the tension members is disposed such that a change in length of each of the tension members when the joint portion is bent and extended is equal to or less than a predetermined threshold value.

The brace according to the present disclosure is configured as described above, and it is unnecessary to connect the first attaching member and the second attaching member to the pressing member by using the link structure having the constant weight and size. Therefore, it is possible to achieve weight reduction and size reduction of the brace.

Further, preferably, the tension members include:
  a first tension member of which one end is fixed to the pressing member on the first attaching member side and of which another end is fixed to the second attaching member such that the first tension member passes through the first attaching member; and
  a second tension member of which one end is fixed to the pressing member on the second attaching member side and of which another end is fixed to the first attaching member such that the second tension member passes through the second attaching member.

With the above configuration, the relative position of the pressing member with respect to the first attaching member and the second attaching member can be appropriately adjusted.

Further, preferably, the first tension member is disposed so as to pass through the first attaching member by a first support mechanism that is provided on the first attaching member and that supports the first tension member such that the first tension member is able to slide; and
  the second tension member is disposed so as to pass through the second attaching member by a second support mechanism that is provided on the second attaching member and that supports the second tension member such that the second tension member is able to slide.

With the above configuration, the first tension member and the second tension member can be disposed such that the changes in the length of the first tension member and the length of the second tension member are equal to or less than a threshold value.

Further, preferably, the tension members include at least one third tension member disposed to fold back between the pressing member and the first attaching member, and between the pressing member and the second attaching member.

With the above configuration, the relative position of the pressing member with respect to the first attaching member and the second attaching member can be appropriately adjusted.

Further, preferably, the brace further includes
  a drag force generating mechanism that is provided at least one of a position between the first attaching member and the pressing member and a position between the second attaching member and the pressing member, and that is configured to generate a drag force against an operation in which the pressing member moves toward or away from the first attaching member and an operation in which the pressing member moves toward or away from the second attaching member.

With the above configuration, the drag force can be generated against the joint portion.

Further, preferably, the brace further includes
  a restricting mechanism configured to restrict reduction of a distance between the first attaching member and the second attaching member.

With the above configuration, the first attaching member and the second attaching member can be suppressed from being detached from the joint portion.

Further, preferably, the brace further includes a moving mechanism configured to move a passing point through which each of the tension members passes.

With the above configuration, individual differences between a plurality of different users can be absorbed when the brace is attached to each of the users.

Further, preferably, each of the tension members is provided with an elastic member.

With the above configuration, individual differences between the users when the brace is attached to each of the users.

According to the present disclosure, it is possible to provide a brace capable of realizing weight reduction and size reduction.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Embodiment 1

Figure 1:
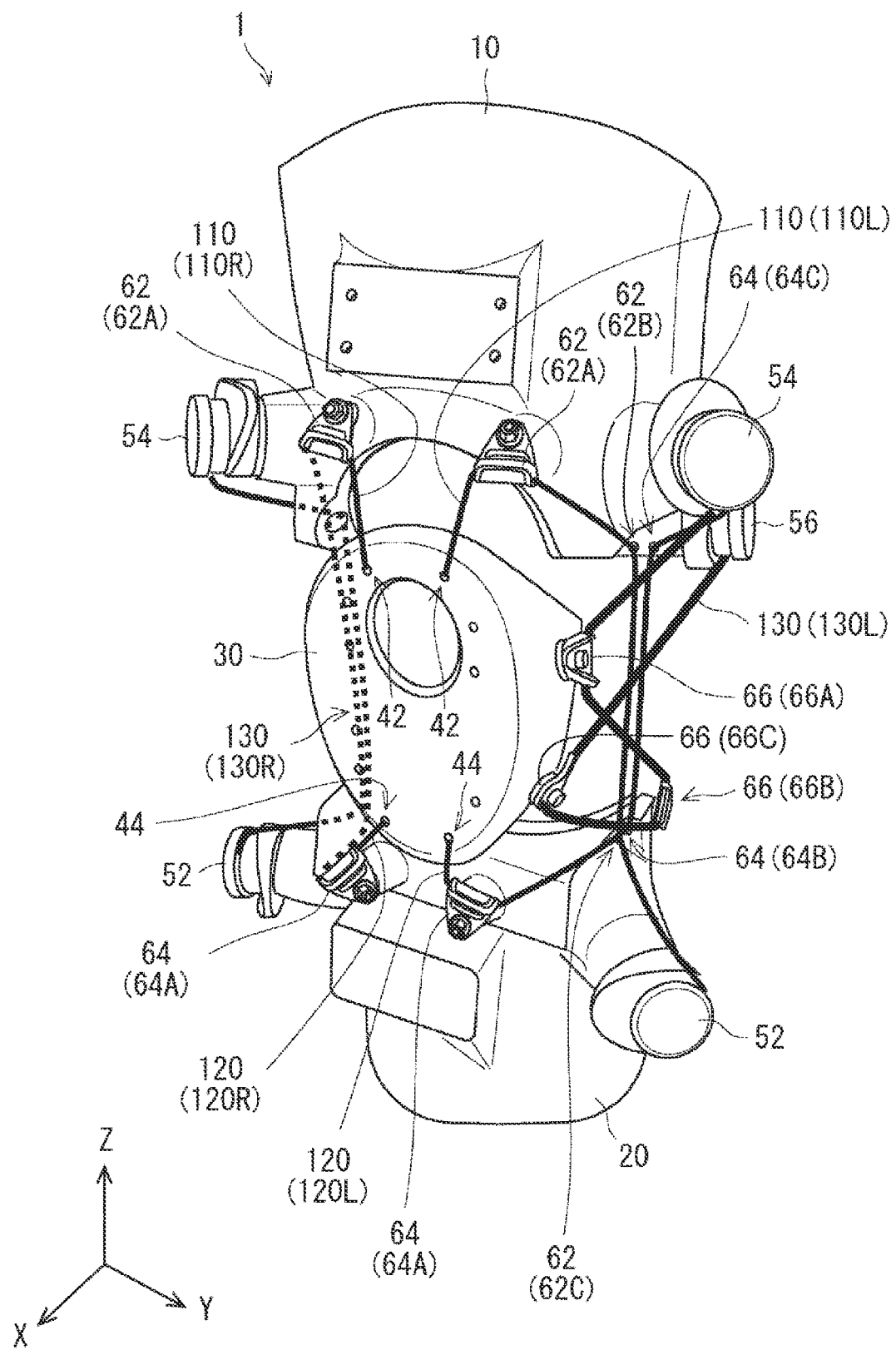
FIG. 1 is a diagram illustrating a brace according to Embodiment 1.

Hereinafter, an embodiment of the present disclosure will be described with reference to the drawings. In order to clarify the explanation, the following description and drawings have been omitted or simplified as appropriate. In the drawings, the same elements are denoted by the same reference numerals, and redundant descriptions are omitted as necessary.

Figure 2:
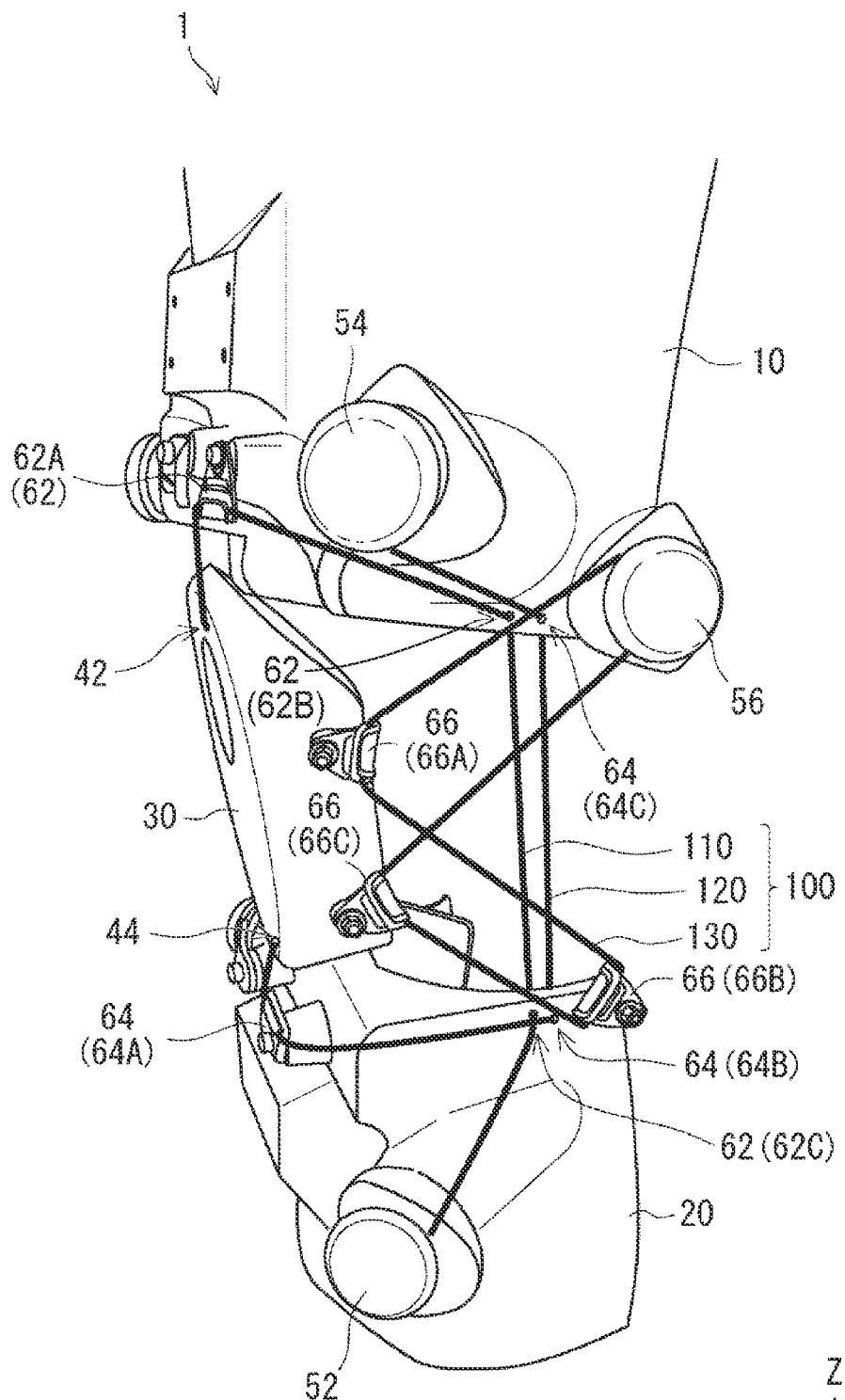
FIG. 2 is a diagram illustrating a brace according to Embodiment 1.
Figure 3:
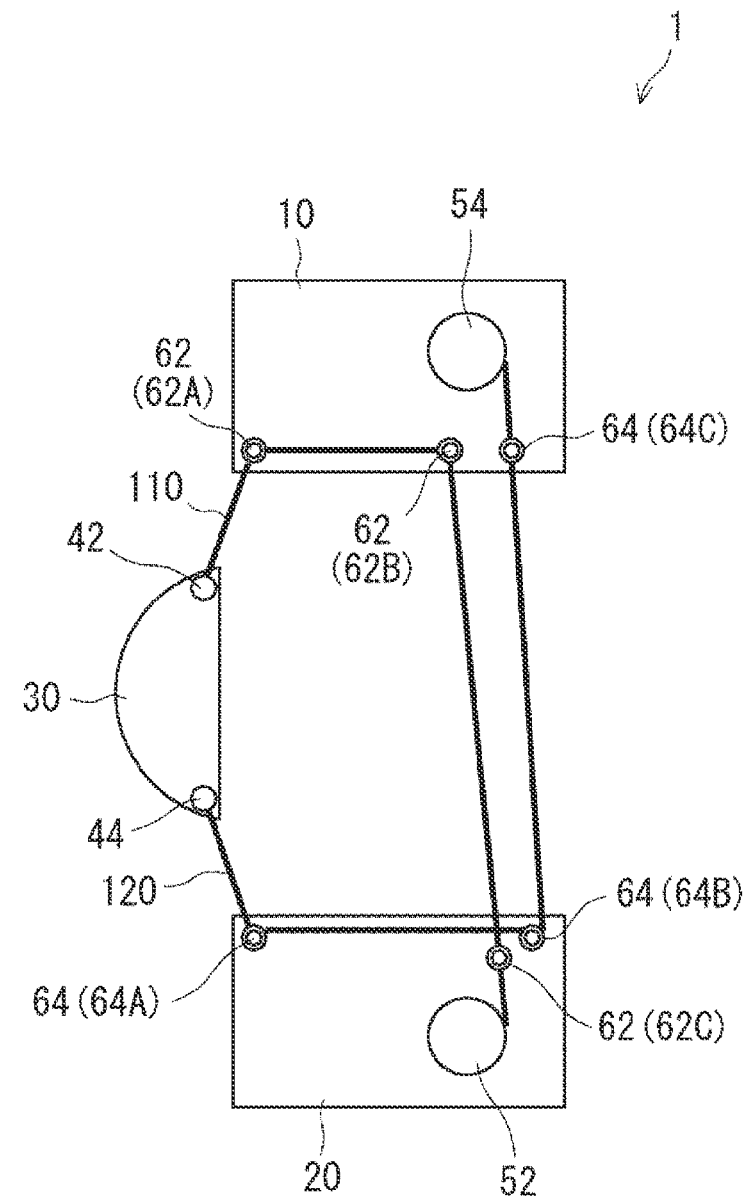
FIG. 3 is a diagram illustrating a brace according to Embodiment 1.
Figure 4:
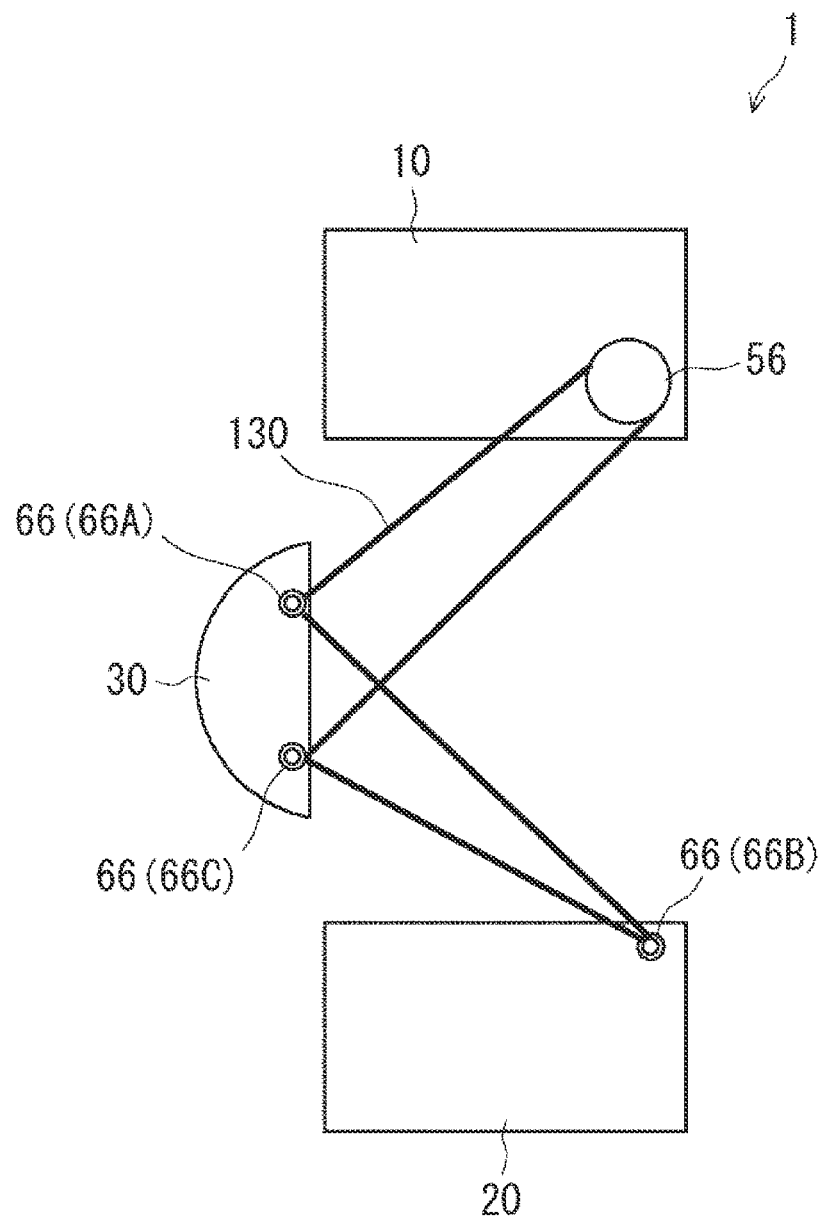
FIG. 4 is a diagram illustrating a brace according to Embodiment 1.

FIG. 1 to FIG. 4 are diagrams illustrating a brace 1 according to Embodiment 1. FIG. 1 is a perspective view showing the external appearance of the brace 1 as viewed from the front side of the brace 1. FIG. 2 is a perspective view showing the appearance of the brace 1 as viewed from the side of the brace 1. FIG. 3 and FIG. 4 are schematic views of the brace 1 as viewed from the side of the brace 1.

The brace 1 according to the present embodiment is worn on the body of a user, etc. The brace 1 is attached to a joint part of the body. For example, the brace 1 is attached to the knee joint, but is not limited thereto. The brace 1 may be attached, for example, to an elbow joint or a finger joint. In the following description, the brace 1 to be attached to the knee joint will be mainly described.

The brace 1 includes a first attaching member 10, a second attaching member 20, and a pressing member 30. The first attaching member 10 is configured to be fixed to a portion on the center side of the body of the joint portion to which the brace 1 is attached. The first attaching member 10 may be formed in a substantially cylindrical shape, for example. When the brace 1 is attached to the knee joint, the first attaching member 10 is attached to the thigh. In this case, the first attaching member 10 functions as a femoral cuff. In addition, in this case, the first attaching member 10 may be fixed to the thigh portion (a portion on the center side of the body of the knee joint) so as to wrap around the thigh portion, for example. That is, the first attaching member 10 may be fixed to the thigh portion by tightening the thigh portion with the thigh portion inserted into the first attaching member 10.

The second attaching member 20 is configured to be fixed to a portion of the joint portion to which the brace 1 is attached on the side opposite to the center side of the body. The second attaching member 20 may be formed in a substantially cylindrical shape, for example. When the brace 1 is attached to the knee joint, the second attaching member 20 is attached to the lower leg. In this case, the second attaching member 20 functions as a lower leg cuff. In addition, in this case, the second attaching member 20 may be fixed to the lower leg portion (a portion opposite to the center side of the body of the knee joint) so as to be wound around the lower leg portion, for example. That is, the second attaching member 20 may be fixed to the lower leg portion by tightening the lower leg portion in a state where the lower leg portion is inserted into the second attaching member 20.

The pressing member 30 is configured to press a portion of the joint portion to which the brace 1 is attached on the side where the joint portion extends when the joint portion is bent. The pressing member 30 may be formed in a substantially plate shape. When the brace 1 is attached to the knee joint, the pressing member 30 functions as a knee pressing member that presses the patella.

For convenience of explanation, the following three-dimensional coordinate system is defined. The Z-axis is the direction along the joint site during extension of the joint site. The negative direction of the Z-axis is a direction from the center side of the body toward the opposite side at the joint portion. Therefore, the first attaching member 10 is positioned on the positive side of the Z-axis with respect to the pressing member 30. The second attaching member 20 is positioned on the negative side of the Z-axis with respect to the pressing member 30. When the brace 1 is attached to the knee joint, the upper direction of the body is defined as the positive direction of the Z-axis.

Further, it is assumed that the Y-axis is perpendicular to the Z-axis and corresponds to the rotation axis when the joint portion is bent. The X-axis is an axis perpendicular to the Z-axis and the Y-axis. The positive direction of the X-axis is a direction corresponding to a side on which the joint portion extends when the joint portion bends with respect to the joint portion. When the brace 1 is attached to the knee joint, the forward direction of the knee joint corresponds to the positive direction of the X-axis. The positive direction of the Y-axis is the positive direction of the Y-axis in the coordinate system of the right-hand system. When the brace 1 is attached to the knee joint, the left side of the knee joint corresponds to the positive direction of the Y-axis.

Further, the brace 1 includes a plurality of tension members 100. The tension member 100 is configured to pull and connect the first attaching member 10, the second attaching member 20, and the pressing member 30. With such a configuration, the brace 1 forms a tensegrity structure. Here, each of the plurality of tension members 100 is arranged such that the amount of change in the length of the tension member 100 when the joint portion is bent and extended is equal to or less than a predetermined threshold value (allowable value). Details will be described later.

The tension member 100 is, for example, a thread-like member such as a wire, but is not limited thereto. The tension member 100 may be, for example, a belt-like member or a ribbon-like member. The tension member 100 may be any member that generates tension on the tension member 100 when both ends are pulled by an external force, and loosens when no tension is generated.

The plurality of tension members 100 includes a first tension member 110, a second tension member 120, and a third tension member 130. Here, as illustrated in FIG. 1, the first tension member 110 includes a first tension member 110L disposed on the positive side of the Y-axis of the brace 1 (for example, the left side of the knee joint), and a first tension member 110R disposed on the negative side of the Y-axis of the brace 1 (for example, the right side of the knee joint). The second tension member 120 includes a second tension member 120L disposed on the positive side of the Y-axis of the brace 1 (for example, the left side of the knee joint), and a second tension member 120R disposed on the negative side of the Y-axis of the brace 1 (for example, the right side of the knee joint). The third tension member 130 includes a third tension member 130L disposed on the positive side of the Y-axis of the brace 1 (e.g., the left side of the knee joint), and a third tension member 130R disposed on the negative side of the Y-axis of the brace 1 (e.g., the right side of the knee joint). In the following description, each tension member 100 disposed on the positive side of the Y-axis of the brace 1 will be described unless otherwise specified, but the same applies to each tension member 100 disposed on the negative side of the Y-axis of the brace 1.

FIG. 3 is a schematic view showing the arrangement of the first tension member 110 and the second tension member 120 in the brace 1 according to the first embodiment. FIG. 4 is a schematic view showing the arrangement of the third tension member 130 in the brace 1 according to the first embodiment. FIG. 3 and FIG. 4 show the positive side of the Y-axis of the brace 1.

One end of the first tension member 110 is fixed to the first attaching member 10 side of the pressing member 30, and the other end thereof is fixed to the second attaching member 20 via the first attaching member 10. The other end of the first tension member 110 is fixed to the second attaching member 20 by the length adjusting mechanism 52. The length adjusting mechanism 52 includes, for example, a mechanism for winding or rewinding the first tension member 110. Accordingly, the length adjusting mechanism 52 functions as an adjusting mechanism that adjusts the length of the first tension member 110. In addition, the length adjusting mechanism 52 may be configured by a winding device that winds the first tension member 110. This also applies to other length adjusting mechanisms described later.

The length of the first tension member 110 is adjusted by operating the length adjusting mechanism 52 when the brace 1 is attached to the joint site. Here, the term "length of the first tension member 110" refers to a length of a portion of the first tension member 110 that exits the length adjusting mechanism 52 (a portion that is not wound up by the length adjusting mechanism 52). That is, the "length of the first tension member 110" does not include the length of the portion wound around the length adjusting mechanism 52 of the first tension member 110. The length of the portion of the first tension member 110 that extends from the length adjusting mechanism 52 may be referred to as the "path length of the first tension member 110".

The first tension member 110 is disposed so as to extend from a position of the pressing member 30 on the side of the first attaching member 10 (the positive direction side of the Z-axis) to a position of the front side of the first attaching member 10 (the positive direction side of the X-axis). The first tension member 110 is arranged so as to extend from the position to the position on the rear side of the first attaching member 10 (on the negative side of the X-axis), and further to the length adjusting mechanism 52 via the position on the rear side of the second attaching member 20 (on the negative side of the X-axis).

One end of the second tension member 120 is fixed to the side of the second attaching member 20 of the pressing member 30, and the other end is fixed to the first attaching member 10 via the second attaching member 20. The other end of the second tension member 120 is fixed to the first attaching member 10 by the length adjusting mechanism 54. The length adjusting mechanism 54 includes, for example, a mechanism for winding or rewinding the second tension member 120. Accordingly, the length adjusting mechanism 54 functions as an adjusting mechanism for adjusting the length of the second tension member 120.

The length of the second tension member 120 is adjusted by operating the length adjusting mechanism 54 when the brace 1 is attached to the joint site. Here, the term "length of the second tension member 120" refers to a length of a portion of the second tension member 120 that exits the length adjusting mechanism 54 (a portion that is not wound up by the length adjusting mechanism 54). That is, the "length of the second tension member 120" does not include the length of the portion wound around the length adjusting mechanism 54 of the second tension member 120. The length of the portion of the second tension member 120 that extends from the length adjusting mechanism 54 may be referred to as a "path length of the second tension member 120".

The second tension member 120 is disposed so as to extend from a position of the pressing member 30 on the side of the second attaching member 20 (the negative side of the Z-axis) to a position of the front side of the second attaching member 20 (the positive side of the X-axis). The second tension member 120 is arranged so as to extend from the position thereof to the position on the rear side of the second attaching member 20 (on the negative side of the X-axis), and further to the length adjusting mechanism 54 via the position on the rear side of the first attaching member 10 (on the negative side of the X-axis).

The third tension member 130 is arranged to be folded back between the pressing member 30 and the first attaching member 10 and between the pressing member 30 and the second attaching member 20. In the example of FIG. 1, both ends of the third tension member 130 are fixed to the first attaching member 10 by the length adjusting mechanism 56. The length adjusting mechanism 56 is provided at a position on the rear side (the negative side of the X-axis) of the first attaching member 10. The length adjusting mechanism 56 includes, for example, a mechanism for winding or rewinding the third tension member 130. Accordingly, the length adjusting mechanism 56 functions as an adjusting mechanism for adjusting the length of the third tension member 130.

The length of the third tension member 130 is adjusted by operating the length adjusting mechanism 56 when the brace 1 is attached to the joint site. Here, the term "length of the third tension member 130" refers to a length of a portion of the third tension member 130 that exits the length adjusting mechanism 56 (a portion that is not wound up by the length adjusting mechanism 56). That is, the "length of the third tension member 130" does not include the length of the portion wound around the length adjusting mechanism 56 of the third tension member 130. Note that the length of the portion of the third tension member 130 that extends from the length adjusting mechanism 56 may be referred to as the "path length of the third tension member 130".

The third tension member 130 is disposed so as to extend from the length adjusting mechanism 56 provided in the first attaching member 10 to the position of the rear side (the negative side of the X-axis) of the second attaching member 20 via the position of the side surface (the positive side of the Y-axis in FIG. 4) of the pressing member 30. The third tension member 130 is folded back at a position on the rear side of the second attaching member 20, and is arranged so as to reach the length adjusting mechanism 56 via a position (a position different from the position described above) on the side surface of the pressing member 30.

The first tension member 110 is supported by the support mechanism 62 provided in the first attaching member 10 and the second attaching member 20. That is, the first tension member 110 is disposed by the support mechanism 62 so as to pass through the first attaching member 10 (and the second attaching member 20). The second tension member 120 is supported by the support mechanism 64 provided in the first attaching member 10 and the second attaching member 20. That is, the second tension member 120 is disposed by the support mechanism 64 so as to pass through the second attaching member 20 (and the first attaching member 10). The third tension member 130 is supported by the support mechanism 66 provided in the pressing member 30 and the second attaching member 20. That is, the third tension member 130 is disposed by the support mechanism 66 so as to pass through the pressing member 30 and the second attaching member 20.

The support mechanism 62 slidably supports the first tension member 110. The support mechanism 64 slidably supports the second tension member 120. The support mechanism 66 slidably supports the third tension member 130. Thus, each support mechanism slidably supports each tension member 100. Each support mechanism functions as a passing point through which each tension member 100 passes. The length adjusting mechanism and the fixing portion described later can also constitute an end portion of each tension member 100, and thus function as a passing point through which each tension member 100 passes.

Figure 5:
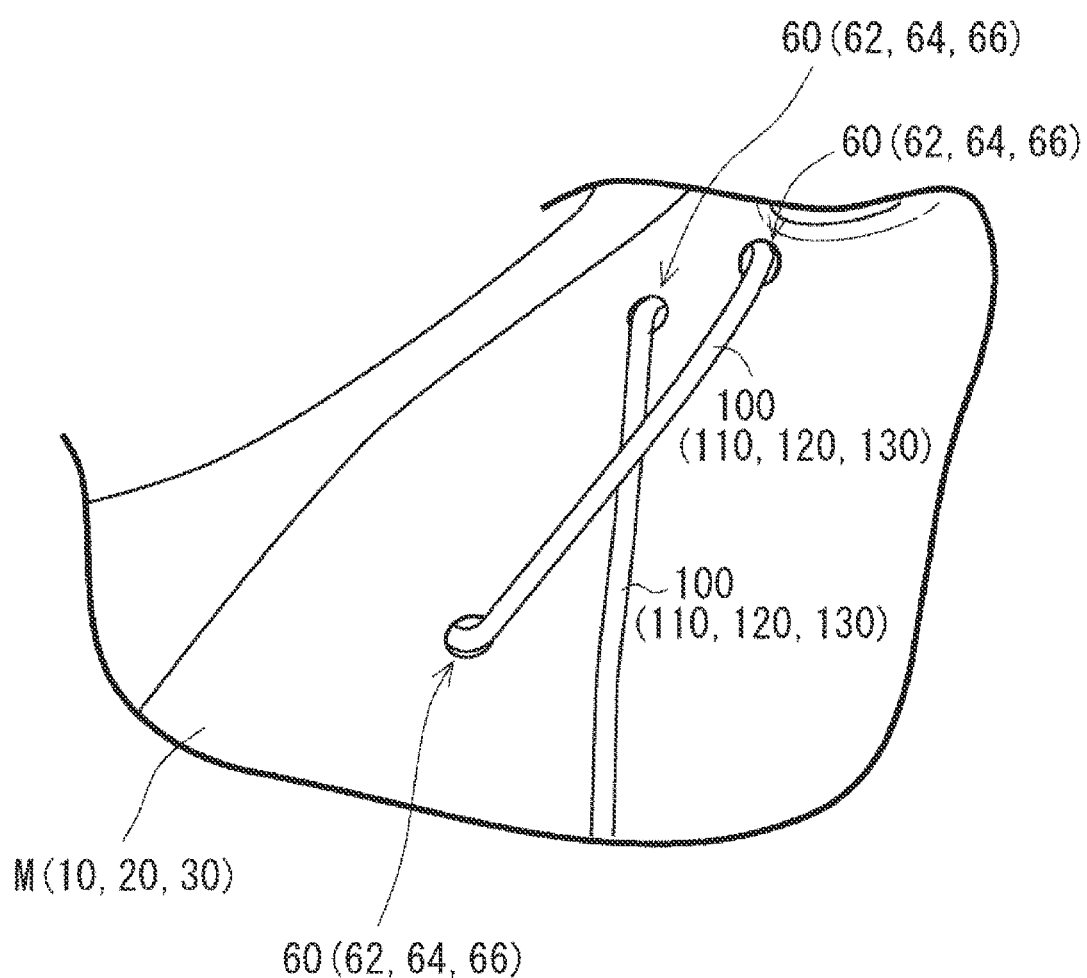
FIG. 5 is a diagram illustrating a support mechanism according to Embodiment 1.
Figure 6:
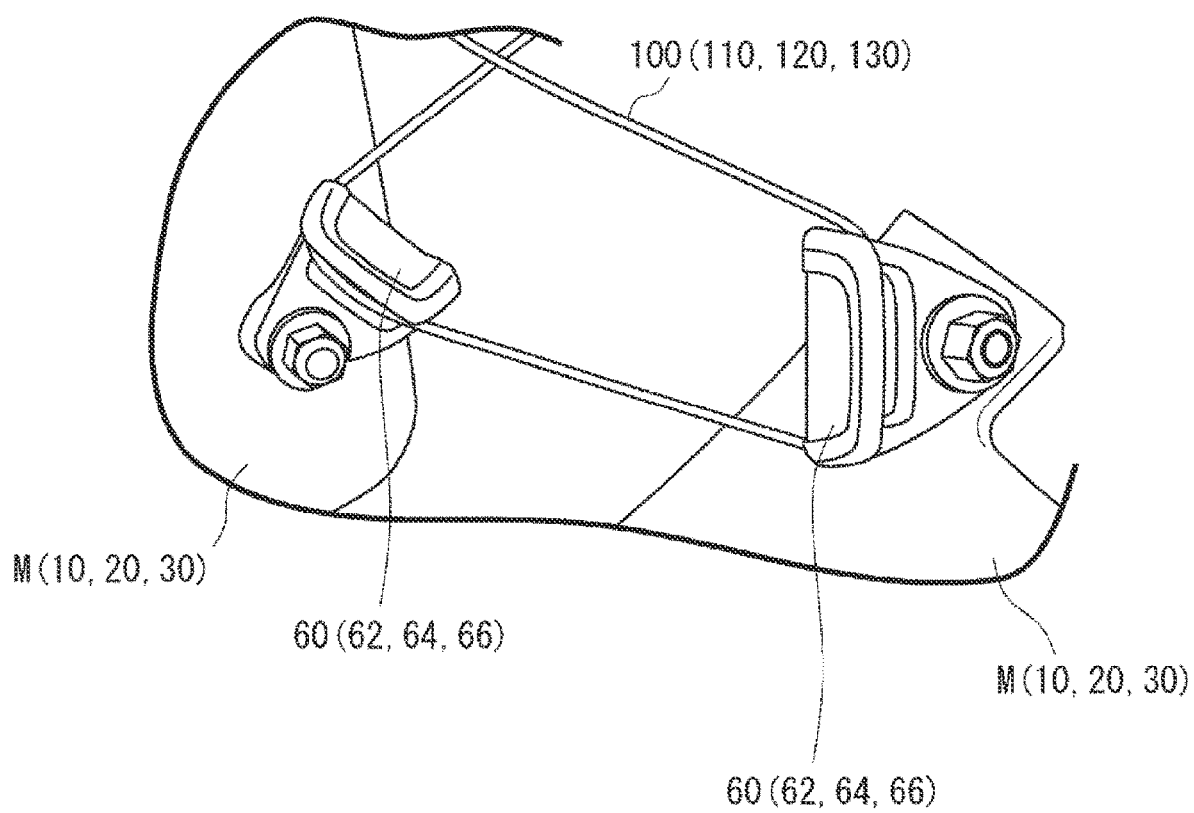
FIG. 6 is a diagram illustrating a support mechanism according to Embodiment 1.
Figure 7:
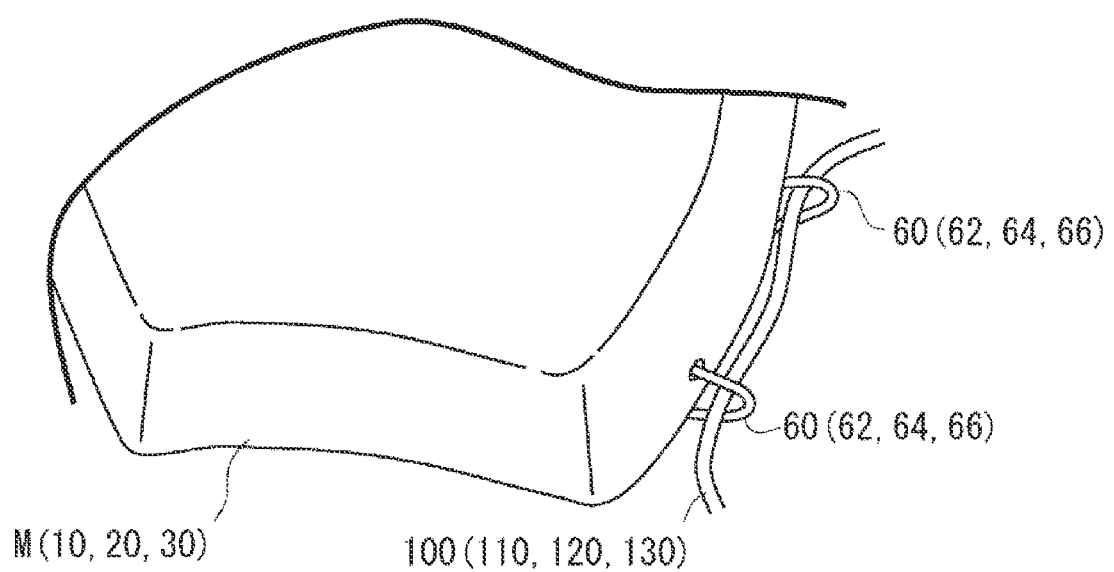
FIG. 7 is a diagram illustrating a support mechanism according to Embodiment 1.

FIG. 5 to FIG. 7 are diagrams illustrating a support mechanism according to Embodiment 1. FIG. 5 illustrates a hole-shaped support mechanism 60 (support mechanisms 62, 64, 66). The support mechanism 60 illustrated in FIG. 5 is formed by forming through-holes in the member M (the first attaching member 10, the second attaching member 20, and the pressing member 30). When the tension member 100 is inserted into the hole-shaped support mechanism 60, the tension member 100 slides on the support mechanism 60. Thus, the support mechanism 60 illustrated in FIG. 5 slidably supports the tension member 100.

FIG. 6 and FIG. 7 illustrate a support mechanism 60 formed by coupling a component separate from the member M to the member M. The support mechanism 60 illustrated in FIG. 6 may be formed by bolting the guide member to the member M. In the example of FIG. 6, the tension member 100 slides on the guide member. Thus, the support mechanism 60 illustrated in FIG. 6 slidably supports the tension member 100.

The support mechanism 60 illustrated in FIG. 7 may be formed by fixing the hook member to the member M. In the example of FIG. 7, the tension member 100 slides on the hook member. Thus, the support mechanism 60 illustrated in FIG. 7 slidably supports the tension member 100.

Incidentally, which support mechanism 60 of the support mechanism 60 illustrated in FIGS. 5 to 7 is employed can be determined depending on the position where the support mechanism 60 is to be provided. For example, in a case where the support mechanism 60 illustrated in FIGS. 6 and 7 cannot be fixed to a position where the support mechanism 60 is provided due to the shape of the member M, the support mechanism 60 illustrated in FIG. 5 may be provided. Alternatively, when the hole-shaped support mechanism 60 illustrated in FIG. 5 cannot be formed at the position where the support mechanism 60 is provided due to the shape of the member M, the support mechanism 60 illustrated in FIGS. 6 and 7 may be provided. Further, the respective configurations of the support mechanisms 62, 64, and 66 illustrated in FIGS. 1 and 2 are not limited to the configurations illustrated in FIGS. 1 and 2. For example, the support mechanism 66 illustrated in FIG. 2 is configured by the support mechanism 60 illustrated in FIG. 6, but may be configured by the support mechanism 60 illustrated in FIG. 5 or FIG. 7.

The first tension member 110 is fixed at one end by a fixing portion 42 at a position on the side (positive direction side of the Z-axis) of the first attaching member 10 of the pressing member 30. The first tension member 110 is slidably supported by a support mechanism 62A provided at a position on the front side (the positive side of the X-axis) of the first attaching member 10. The first tension member 110 is slidably supported by a support mechanism 62B provided at a position on the rear side (the negative side of the X-axis) of the first attaching member 10. The first tension member 110 is slidably supported by a support mechanism 62C provided at a position on the rear side (the negative side of the X-axis) of the second attaching member 20. As described above, the other end of the first tension member 110, which is different from the one end fixed to the fixing portion 42, is fixed by the length adjusting mechanism 52. Note that not all of the support mechanisms 62A, 62B, 62C need be provided. For example, the support mechanism 62C may be absent.

One end of the second tension member 120 is fixed by the fixing portion 44 at a position on the side of the second attaching member 20 (the side in the negative direction of the Z-axis) of the pressing member 30. The second tension member 120 is slidably supported by a support mechanism 64A provided at a position on the front side (the positive side of the X-axis) of the second attaching member 20. The second tension member 120 is slidably supported by a support mechanism 64B provided at a position on the rear side (the negative side of the X-axis) of the second attaching member 20. The second tension member 120 is slidably supported by a support mechanism 64C provided at a position on the rear side (the negative side of the X-axis) of the first attaching member 10. As described above, the other end of the second tension member 120, which is different from the one end fixed to the fixing portion 44, is fixed by the length adjusting mechanism 54. Note that not all of the support mechanisms 64A, 64B, 64C need be provided. For example, the support mechanism 64C may be absent.

As described above, one end of the third tension member 130 is fixed by the length adjusting mechanism 56 provided in the first attaching member 10. The third tension member 130 is slidably supported by a support mechanism 66A provided at a position on the side surface (positive Y-axis side) of the pressing member 30. The third tension member 130 is slidably supported by a support mechanism 66B provided at a position on the rear side (the negative side of the X-axis) of the second attaching member 20. The third tension member 130 is slidably supported by a support mechanism 66C provided at a position of a side surface of the pressing member 30 (a position different from the position of the support mechanism 66A). As described above, the other end of the third tension member 130 is fixed by the length adjusting mechanism 56 provided in the first attaching member 10. Thus, the third tension member 130 is arranged to be folded back between the pressing member 30 and the first attaching member 10 and between the pressing member 30 and the second attaching member 20. The configuration for supporting the third tension member 130 and the configuration for fixing both ends thereof may be reversed between the positive direction and the negative direction of the Z-axis. That is, the length adjusting mechanism 56 may be provided on the second attaching member 20, and the support mechanism 66C may be provided on the first attaching member 10.

The support mechanism 60 may provide adequate tension to the tension member 100. That is, by appropriately arranging the support mechanism 60 that supports the tension member 100, tension can be generated in the tension member 100 so that the pressing member 30 can continue to press the joint portion regardless of the joint angle of the joint portion. In addition, this prevents the brace 1 from being displaced from the joint portion. Therefore, since it is unnecessary to use a link structure having a constant weight and size, it is possible to realize a reduction in weight and a reduction in size of the brace 1.

In other words, in the brace 1 according to the first embodiment, it is necessary to determine the relative positions of the pressing member 30 with respect to the first attaching member 10 and the second attaching member 20. The relative position of the pressing member 30 may be determined by the balance of the tensile forces of the first tension member 110, the second tension member 120, and the third tension member 130. That is, in the brace 1, the force applied from the first attaching member 10 to the joint portion and the force applied from the second attaching member 20 to the joint portion and the force applied from the pressing member 30 to the joint portion are balanced, whereby the relative position of the pressing member 30 is determined, and the pressing member 30 can come into contact with the joint portion. When the amount of change in the length (path length) of each of the first tension member 110, the second tension member 120, and the third tension member 130 due to the bending and extension of the joint portion becomes equal to or less than the threshold value, the tension of each of the first tension member 110, the second tension member 120, and the third tension member 130 can be maintained. In this case, the first tension member 110, the second tension member 120, and the third tension member 130 can apply tension to the pressing member 30. As a result, the pressing member 30 can continue to press the joint portion regardless of the joint angle of the joint portion. Therefore, it is possible to suppress the pressing member 30 from moving with respect to the joint portion.

The first tension member 110 pulls the pressing member 30 in the positive direction (upward direction) of the Z-axis at two positions (two left and right positions) in the Y-axis direction. Further, the second tension member 120 pulls the pressing member 30 in the negative direction (downward direction) of the Z-axis at two positions (two left and right positions) in the Y-axis direction. Therefore, the position of the pressing member 30 in the Z-axis direction (up-down direction), the position in the Y-axis direction (left-right direction), the angle around the X-axis (roll angle), and the angle around the Z-axis (yaw angle) with respect to the first attaching member 10 and the second attaching member 20 can be determined by the first tension member 110 and the second tension member 120.

The third tension member 130 pulls the pressing member 30 from the first attaching member 10 in the negative direction of the X-axis at two positions (two positions in the upper and lower directions) in the Z-axis direction. The third tension member 130 pulls the pressing member 30 from the second attaching member 20 in the negative direction of the X-axis at two positions (two positions in the upper and lower directions) in the Z-axis direction. Therefore, the position of the pressing member 30 in the X-axis direction (front-rear direction), the angle around the Y-axis (pitch angle), and the angle around the Z-axis (yaw angle) with respect to the first attaching member 10 and the second attaching member 20 can be determined by the third tension member 130.

Figure 8:
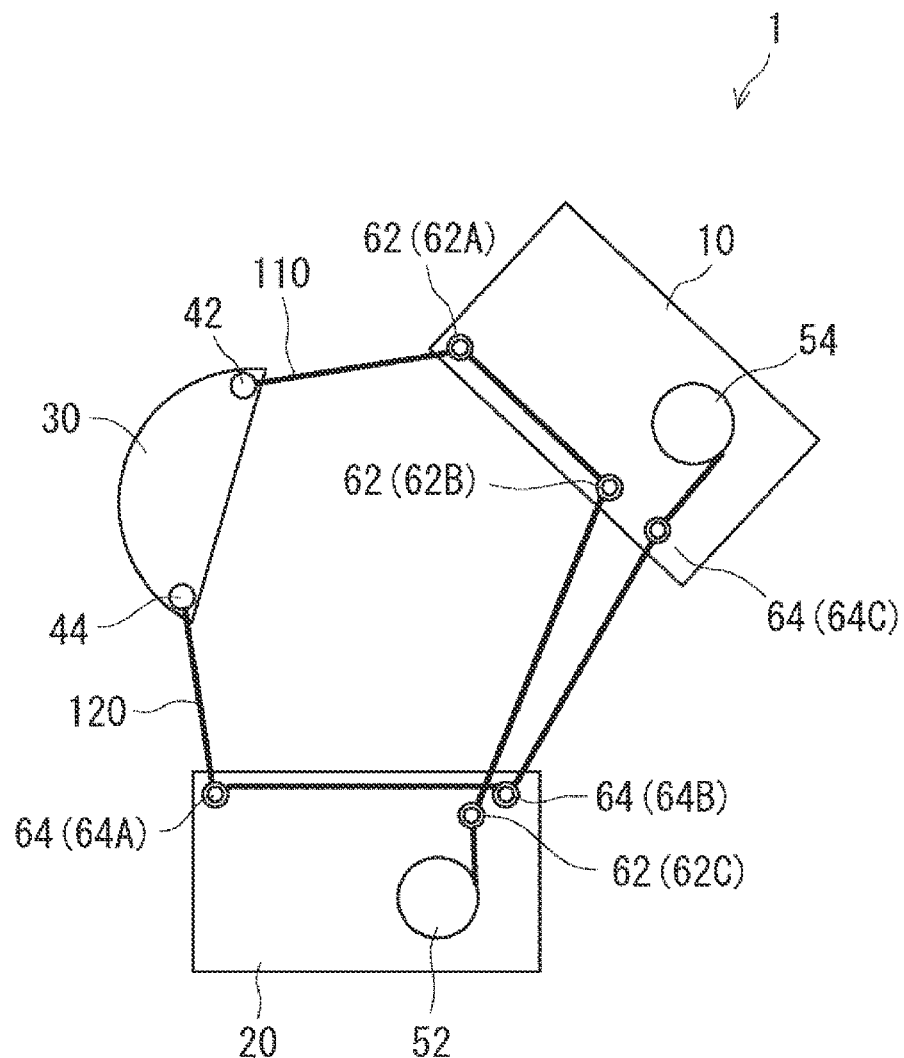
FIG. 8 is a view showing the behavior of the first tension member and the second tension member when the joint portion is bent in a state where the brace according to the first embodiment is attached to the joint portion.

FIG. 8 is a diagram illustrating the behavior of the first tension member 110 and the second tension member 120 when the joint portion is bent in a state where the brace 1 according to the first embodiment is attached to the joint portion. Here, when the joint portion is bent or extended, the relative positions of the first attaching member 10, the second attaching member 20, and the pressing member 30 are changed.

When the joint portion is bent, as shown in FIG. 8, the first attaching member 10 rotates around the Y-axis toward the side in the negative direction of the X-axis as viewed from the second attaching member 20. Here, when the joint portion is bent, the front side (the side in the positive direction of the X-axis) of the joint portion is extended and the rear side (the side in the negative direction of the X-axis) is contracted.

Therefore, in the first tension member 110, the length between the fixing portion 42 and the support mechanism 62A is longer than that in FIG. 3. On the other hand, in the first tension member 110, the length between the support mechanism 62B and the support mechanism 62C is shorter than that in FIG. 3. Note that the length between the support mechanism 62A and the support mechanism 62B in the first tension member 110 does not change because both the support mechanism 62A and the support mechanism 62B are provided in the first attaching member 10. Similarly, since both the support mechanism 62C and the length adjusting mechanism 52 are provided in the second attaching member 20, the length between the support mechanism 62C and the length adjusting mechanism 52 in the first tension member 110 does not change.

As described above, when the joint portion is bent, the length between the support mechanism 62B and the support mechanism 62C is decreased while the length between the fixing portion 42 and the support mechanism 62A is increased in the first tension member 110. Conversely, as the joint portion extends, the length between the support mechanism 62B and the support mechanism 62C increases while the length between the fixing portion 42 and the support mechanism 62A decreases in the first tension member 110. Here, as described above, in order to maintain the tension of the first tension member 110, the amount of change in the path length of the first tension member 110 due to the bending and extension of the joint portion needs to be equal to or less than the allowable value (threshold value). Thus, the total length L1 between the length between the fixing portion 42 and the support mechanism 62A and the length between the support mechanism 62B and the support mechanism 62C need not vary much, even with flexion and extension of the joint site. That is, the fixing portion 42, the length adjusting mechanism 52, and the support mechanisms 62 may be arranged so that the variation in the total length L1 due to the bending and extension of the joint portion is equal to or less than a predetermined threshold Th1. A method of arranging the fixing portion 42, the length adjusting mechanism 52, and the support mechanism 62 will be described later. The total length L1 may include a length between the support mechanism 62A and the support mechanism 62B, and a length between the support mechanism 62C and the length adjusting mechanism 52.

When the joint portion is bent, the length between the fixing portion 44 and the support mechanism 64A in the second tension member 120 is longer than that in FIG. 3. On the other hand, in the second tension member 120, the length between the support mechanism 64B and the support mechanism 64C is shorter than that in FIG. 3. Note that the length between the support mechanism 64A and the support mechanism 64B in the second tension member 120 does not change because both the support mechanism 64A and the support mechanism 64B are provided in the second attaching member 20. Similarly, since both the support mechanism 64C and the length adjusting mechanism 54 are provided in the first attaching member 10, the length between the support mechanism 64C and the length adjusting mechanism 54 in the second tension member 120 does not change.

Similarly, in the second tension member 120, when the joint portion is bent, the length between the fixing portion 44 and the support mechanism 64A is increased, and the length between the support mechanism 64B and the support mechanism 64C is decreased. Conversely, as the joint portion extends, in the second tension member 120, the length between the support mechanism 64B and the support mechanism 64C increases while the length between the fixing portion 44 and the support mechanism 64A decreases. Here, as in the case of the first tension member 110, in order to maintain the tension of the second tension member 120, the amount of change in the path length of the second tension member 120 due to the bending and extension of the joint portion needs to be equal to or less than an allowable value (threshold value). Thus, the total length L2 between the length between the fixing portion 44 and the support mechanism 64A and the length between the support mechanism 64B and the support mechanism 64C need not vary much, even with flexion and extension of the joint site. That is, the fixing portion 44, the length adjusting mechanism 54, and the support mechanisms 64 may be arranged so that the variation in the total length L2 due to the bending and extension of the joint portion is equal to or less than a predetermined threshold Th2. A method of arranging the fixing portion 44, the length adjusting mechanism 54, and the support mechanism 64 will be described later. The total length L2 may include a length between the support mechanism 64A and the support mechanism 64B, and a length between the support mechanism 64C and the length adjusting mechanism 54. The threshold Th2 may be the same as or different from the threshold Th1.

Figure 9:
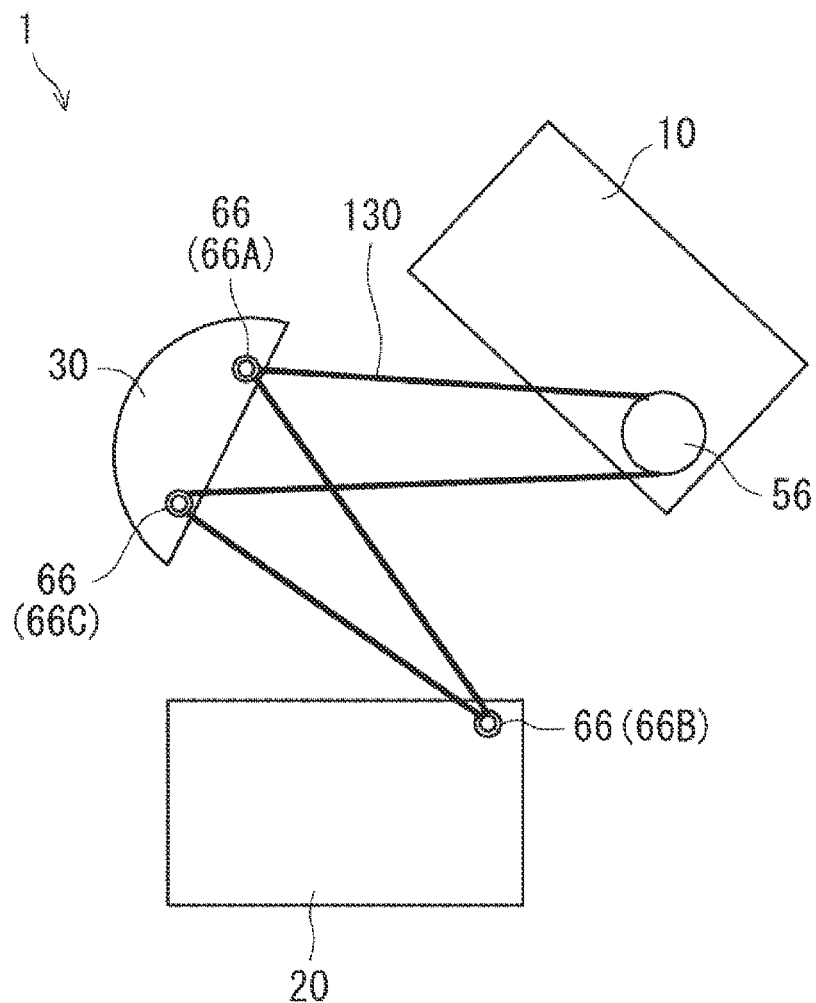
FIG. 9 is a diagram illustrating the behavior of the third tension member when the joint portion is bent in a state where the brace according to the first embodiment is attached to the joint portion.

FIG. 9 is a diagram illustrating the behavior of the third tension member 130 when the joint portion is bent in a state where the brace 1 according to the first embodiment is attached to the joint portion. As in the state of FIG. 8, as the joint portion bends, as shown in FIG. 9, the first attaching member 10 rotates around the Y-axis toward the side in the negative direction of the X-axis as viewed from the second attaching member 20. Here, as described above, when the joint portion is bent, the front side (the side in the positive direction of the X-axis) of the joint portion is extended and the rear side (the side in the negative direction of the X-axis) is contracted. Here, the distance between the length adjusting mechanism 56 and the support mechanism 66B is shortened.

Here, as in the case of the first tension member 110 and the second tension member 120, the length adjusting mechanism 56, the support mechanism 66A, the support mechanism 66B, and the support mechanism 66C may be arranged so that the variation of the path length of the third tension member 130 is equal to or less than a predetermined threshold Th3. A method of arranging the length adjusting mechanism 56 and the support mechanism 66 will be described later. The threshold Th3 may be different from the threshold Th1, Th2 described above.

As described above, the third tension member 130 is arranged to be folded back between the pressing member 30 and the first attaching member 10 and between the pressing member 30 and the second attaching member 20. Therefore, the change in the path length of the third tension member 130 due to the bending and extension of the joint portion is folded and halved in each of the plurality of partial paths formed by the folding. In the exemplary embodiments of FIGS. 4 and 9, the third tension member 130 is folded back between the first attaching member 10 and the pressing member 30, thereby forming two partial paths, i.e., a partial path between the length adjusting mechanism 56 and the support mechanism 66A, and a partial path between the support mechanism 66C and the length adjusting mechanism 56. Similarly, the third tension member 130 is folded back between the pressing member 30 and the second attaching member 20, thereby forming two partial paths, i.e., a partial path between the support mechanism 66A and the support mechanism 66B and a partial path between the support mechanism 66B and the support mechanism 66C. Thus, four sub-paths will be configured. Changes in the path length of the third tension member 130 are distributed to these partial paths. Therefore, for example, when the total amount of change in the path length of the third tension member 130 is 8 mm, if the total amount of change is distributed to the respective partial paths in a substantially uniform manner, the amount of change in one partial path is approximately 2 mm. Therefore, the effect on the pressing member 30 is smaller than that of the variation of 8 mm of the entire path length. Therefore, by arranging the third tension member 130 so as to be folded back between the pressing member 30 and the first attaching member 10 and between the pressing member 30 and the second attaching member 20, it is possible to suppress the influence of the change in the path length of the third tension member 130 on the pressing member 30.

Figure 10:
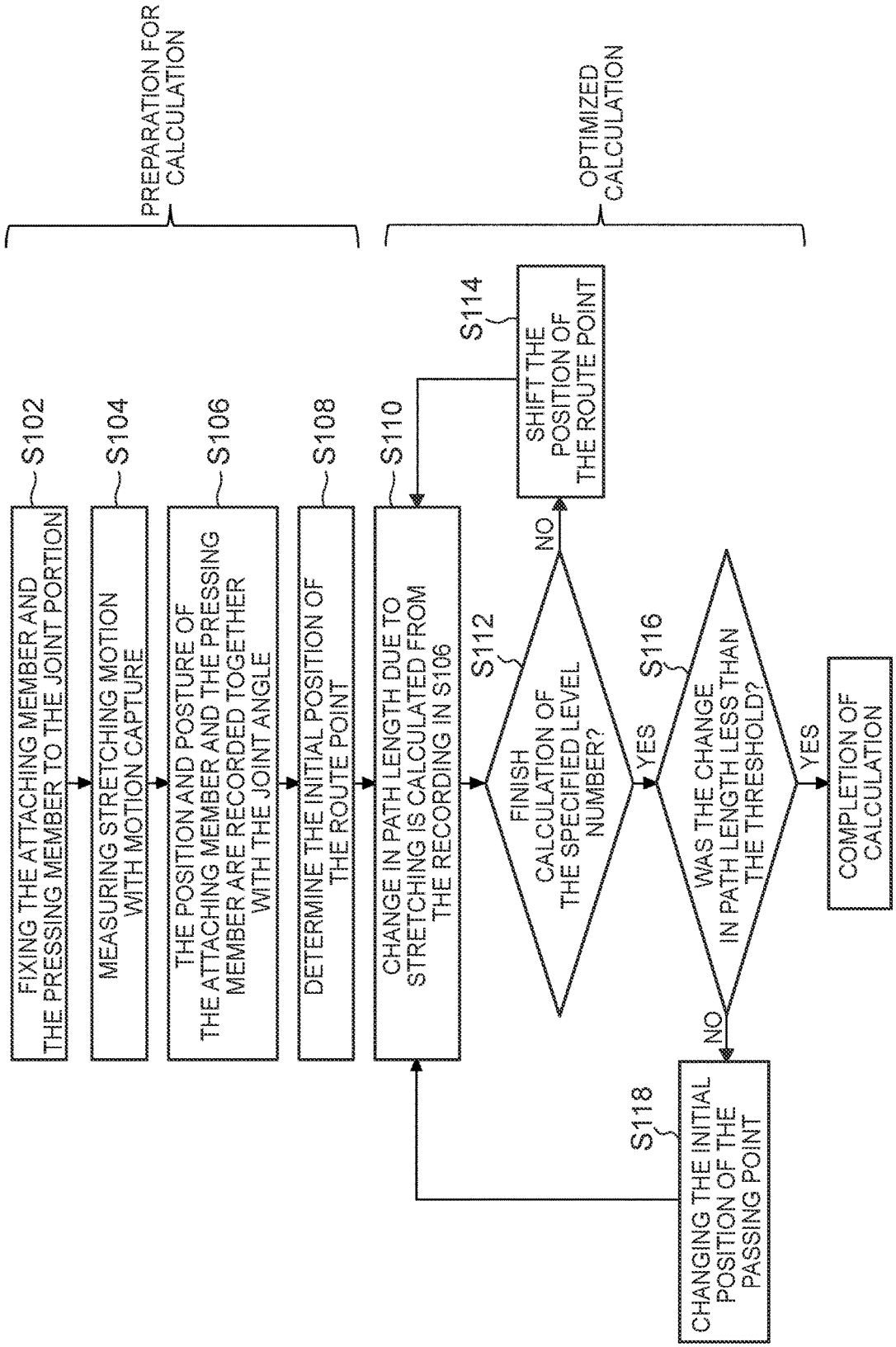
FIG. 10 is a flowchart illustrating a method of determining an arrangement of a passing point of each tension member in the brace 1 according to the first embodiment.

FIG. 10 is a flowchart illustrating a method of determining the arrangement of the passing points of the tension members 100 in the brace 1 according to the first embodiment. Preparation is first performed prior to calculating the position of the passing point (fixing portion, support mechanism and length adjusting mechanisms) (S102 to S108). The operator fixes the first attaching member 10, the second attaching member 20, and the pressing member 30 to the joint portion of the user (step S102). In this state, the tension member 100 is not attached to the first attaching member 10, the second attaching member 20, and the pressing member 30. Therefore, the first attaching member 10, the second attaching member 20, and the pressing member 30 are independently fixed to the joint site. For example, in the case of determining the arrangement of the passing point for the brace 1 to be attached to the knee joint, the first attaching member 10 (femoral cuff) is fixed to the thigh, the second attaching member 20 (lower leg cuff) is fixed to the lower leg, and the pressing member 30 (knee presser) is independently fixed to a position corresponding to the patella.

Next, the user performs flexion and extension movement of the joint portion, and the operator measures flexion and extension movement of the joint portion by motion capture (step S104). Then, the operator records the joint angle and the positions and orientations of the first attaching member 10, the second attaching member 20, and the pressing member 30 using the data obtained by the measurement (step S106). Then, the operator determines an initial position of the passing point (step S108). The initial position of the passing point may be arbitrarily determined by the operator from, for example, the position of the passing point in the brace 1 designed previously.

Next, an optimization computation of the location of the passing point is performed (S110 to S118). The optimization calculation can be executed by, for example, a simulation in a computer (information processing apparatus). The computer uses the recording in S106 to calculate the variation of the path length of the tension member 100 (the first tension member 110, the second tension member 120, or the third tension member 130) with the bending and stretching (step S110). Specifically, the computer calculates a path length at each joint angle when the joint site is bent and extended. Then, the computer calculates a difference from the path length when the length changes most with respect to the reference length of the path length as a change amount of the path length. The reference length may be, for example, the path length at the first moment when the bending and stretching motion is started.

It should be noted that the path length of the tension member 100 may be indicated by the sum of the distances between the passing points. For example, the path length of the first tension member 110 shown in FIG. 3 corresponds to the sum of the distance between the fixing portion 42 and the support mechanism 62A, the distance between the support mechanism 62A and the support mechanism 62B, the distance between the support mechanism 62B and the support mechanism 62C, and the distance between the support mechanism 62C and the length adjusting mechanism 52. The path length of the second tension member 120 illustrated in FIG. 3 corresponds to the sum of the distance between the fixing portion 44 and the support mechanism 64A, the distance between the support mechanism 64A and the support mechanism 64B, the distance between the support mechanism 64B and the support mechanism 64C, and the distance between the support mechanism 64C and the length adjusting mechanism 54. Also, the path length of the third tension member 130 shown in FIG. 4 corresponds to the sum of the distance between the length adjusting mechanism 56 and the support mechanism 66A, the distance between the support mechanism 66A and the support mechanism 66B, the distance between the support mechanism 66B and the support mechanism 66C, and the distance between the support mechanism 66C and the length adjusting mechanism 56.

The computer determines whether or not the specified level has been calculated (step S112). Here, the specified level number refers to the number of trials for calculating the position of the passing point by shifting. The computer repeats an attempt to shift the position of the passing point and calculate it until the specified number of levels is reached, as described below. In addition, in the trial, not only the position of the passing point may be changed, but also the number of the passing points may be changed. If the specified level count has not been calculated (NO of S112), the computer shifts the position of the passing point on the simulator (step S114). For example, the computer may arbitrarily move the position of the passing point within a predetermined range in which the passing point can be installed, including the initial position, with respect to each passing point. Further, the computer may move the position of the passing point independently for each of the passing points. The simulating may be realized by a virtual space such as a three-dimensional Computer Aided Design (CAD), for example.

Then, S110 process is executed again at the position of the transferred passing point. In this way, the process of S110 is performed by moving the passing point a little, and the process is repeated by a specified level. The number of specified levels corresponds to the number of combinations of the positions of the respective passing points. For example, the number of specified levels may be 300.

Then, when the specified level is calculated (YES of S112), the computer determines whether or not the variation of the path length is equal to or less than a predetermined threshold (step S116). Specifically, the computer selects the smallest change amount of the path length calculated in each of the above-described calculation of the predetermined level number. For example, when the number of specified levels is 300, the smallest one of the 300 path length changes is selected. Then, the computer determines whether or not the amount of change in the selected path length is equal to or less than a threshold value. The thresholds may be the same as Th1, Th2, or Th3 described above.

When the variation of the path length selected above is not equal to or smaller than the threshold value (NO of S116), the initial position of the passing point is changed (step S118). The change of the initial position may be arbitrarily performed by an operator. Alternatively, each of the passing points that realizes the path of the minimum change amount (the arrangement of the tension member 100) that is not equal to or less than the threshold value obtained by the optimization calculation of the predetermined level number may be set as the initial position. Then, S110 to S118 process is repeated.

On the other hand, if the variation of the path length is less than or equal to the threshold (YES in S116), the computer terminates the computation. Then, the position of each passing point that realizes the path (the arrangement of the tension member 100) with the smallest amount of change is determined as the position of the passing point (the fixing portion, the support mechanism, and the length adjusting mechanism) installed in each member. In this manner, each tension member 100 can be arranged such that the amount of change in the length (path length) of the tension member 100 when the joint portion is bent and extended is equal to or less than the threshold value.

If S116 process is YES, it may be checked whether the tension member 100 does not interfere with the body part. In particular, the computer places, on the simulation, each passing point at the determined position of the passing point with respect to the brace 1, and places each tension member 100 with respect to the arranged passing point. The computer causes the brace 1 in which each tension member 100 is disposed to be attached to the joint site on a simulation. Then, the computer determines whether or not each tension member 100 does not interfere with the joint region and the surrounding region. In a case where the tension member 100 does not interfere with the body part, as described above, the position of each passing point that realizes the path with the smallest amount of change is determined as the position of the passing point (the fixing portion, the support mechanism, and the length adjusting mechanism) installed in each member.

On the other hand, when the tension member 100 interferes with a part of the body, for example, the computer may perform the above-described processing by arranging each passing point at a position of a passing point that realizes a path of a change amount that is not minimum but is equal to or less than a threshold value obtained by the optimization calculation. Then, when the tension member 100 interferes with the body part even if the above-described processing is performed on all the paths of the variation that is equal to or less than the threshold value obtained by the optimization calculation, the initial position of the passing point may be changed and the processing of S110 to S118 may be performed again.

As described above, the brace 1 according to the present embodiment includes the first attaching member 10, the second attaching member 20, the pressing member 30, and the plurality of tension members 100. The tension member 100 is disposed such that the amount of change in the length (path length) of the tension member 100 when the joint portion is bent and extended is equal to or less than a predetermined threshold value. As a result, as described above, the tension generated in the tension member 100 can be maintained, and thus the tension can be applied to the pressing member 30. As a result, the pressing member 30 can continue to press the joint portion regardless of the joint angle of the joint portion. Here, in the present embodiment, as a member for connecting the first attaching member 10, the second attaching member 20, and the pressing member 30, a tension member 100 having a size that is lighter and slimmer than the link structure is used. Therefore, it is unnecessary to connect the attaching member and the pressing member using a link structure having a constant weight and size, so that it is possible to realize a reduction in weight and a reduction in size of the brace 1.

Further, in the brace 1 according to the present embodiment, the plurality of tension members 100 may include the first tension member 110 and the second tension member 120. As described above, the position of the pressing member 30 in the Z-axis direction, the position in the Y-axis direction, the angle around the X-axis, and the angle around the Z-axis with respect to the first attaching member 10 and the second attaching member 20 can be determined by the first tension member 110 and the second tension member 120. Therefore, the relative position of the pressing member 30 with respect to the first attaching member 10 and the second attaching member 20 can be appropriately adjusted.

Further, in the brace 1 according to the present embodiment, the first tension member 110 may be disposed so as to pass through the first attaching member 10 by the support mechanism 62 provided in the first attaching member 10. Further, the second tension member 120 may be disposed so as to pass through the second attaching member 20 by the support mechanism 64 provided in the second attaching member 20. Accordingly, the first tension member 110 and the second tension member 120 can be arranged more appropriately so that the amount of change in the length of the first tension member 110 and the length of the second tension member 120 are equal to or less than the threshold value. Therefore, a tension can be generated in the first tension member 110 and the second tension member 120 more appropriately.

Further, in the brace 1 according to the present embodiment, the plurality of tension members 100 may include at least one third tension member 130 arranged to be folded back between the pressing member 30 and the first attaching member 10 and between the pressing member 30 and the second attaching member 20. As described above, the third tension member 130 may determine the position of the pressing member 30 in the X-axis direction, the angle around the Y-axis, and the angle around the Z-axis with respect to the first attaching member 10 and the second attaching member 20. Therefore, the relative position of the pressing member 30 with respect to the first attaching member 10 and the second attaching member 20 can be appropriately adjusted.

Embodiment 2

Next, a second embodiment will be described. The brace 1 according to the second embodiment is different from the brace 1 according to the first embodiment in that it has a drag force generating mechanism. Note that other configurations of the second embodiment are substantially the same as those of the first embodiment, and thus description thereof will be omitted.

Figure 11:
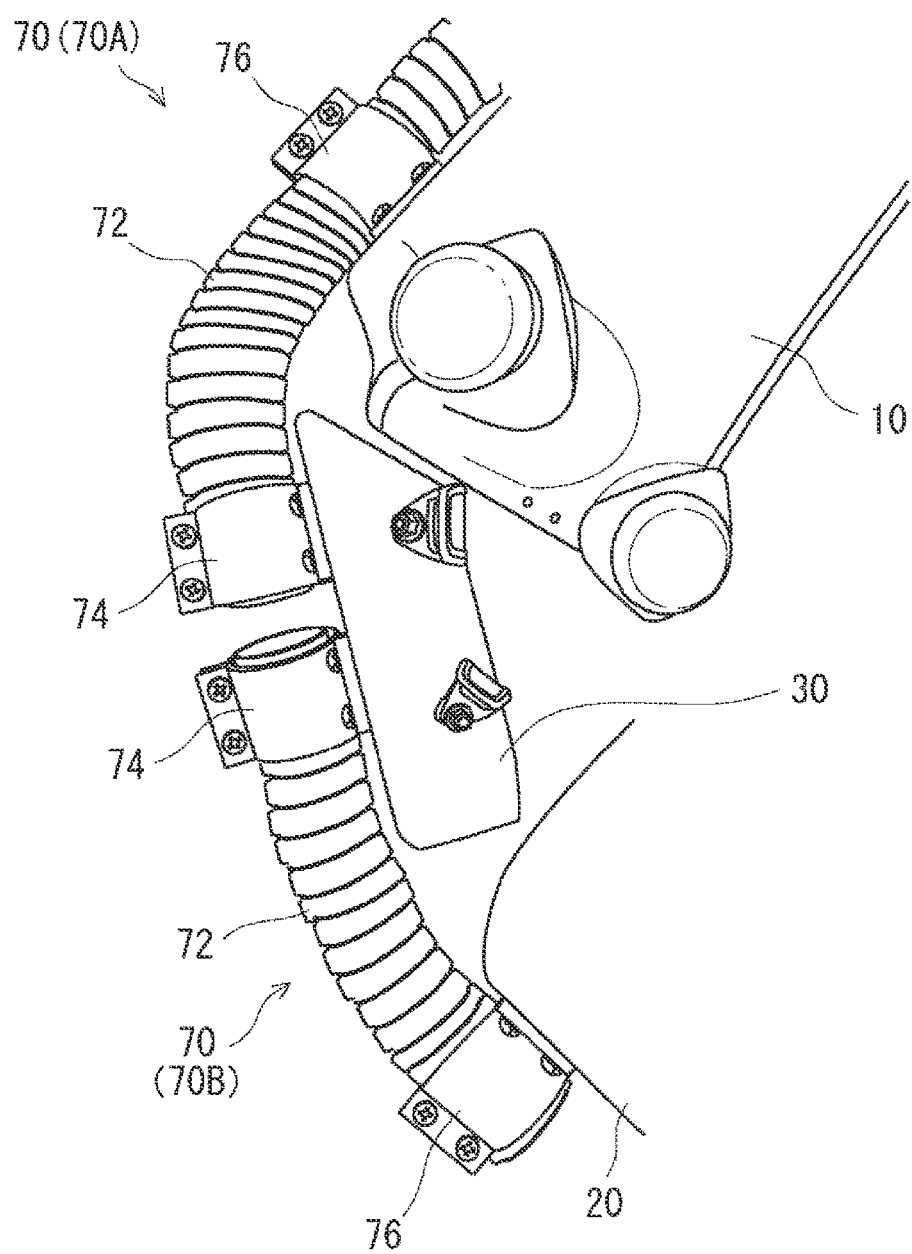
FIG. 11 is a diagram illustrating a drag force generating mechanism according to Embodiment 2.

FIG. 11 is a diagram illustrating the drag force generating mechanism 70 according to the second embodiment. In FIG. 11, the drawing of the tension member 100 is omitted for the sake of explanation. The drag force generating mechanism 70 (70A) is provided between the first attaching member 10 and the pressing member 30. Further, the drag force generating mechanism 70 (70B) is provided between the second attaching member 20 and the pressing member 30. The drag force generating mechanism 70 is configured to generate a drag force against the joint portion when the brace 1 is attached to the joint portion.

The drag force generating mechanism 70 includes a drag force generating member 72 and fixing members 74 and 76. In the drag force generating mechanism 70A, the fixing member 74 is fixed to the pressing member 30, and the fixing member 76 is fixed to the first attaching member 10, whereby the drag force generating mechanism 70A is fixed between the first attaching member 10 and the pressing member 30. Further, in the drag force generating mechanism 70B, the fixing member 74 is fixed to the pressing member 30, and the fixing member 76 is fixed to the second attaching member 20, whereby the drag force generating mechanism 70B is fixed between the second attaching member 20 and the pressing member 30.

The drag force generating member 72 is configured to have a substantially cylindrical shape capable of expanding and contracting. The drag force generating member 72 may be formed in a bellows shape, for example. When the joint portion is bent, the drag force generating member 72 is extended, and the volume of the drag force generating member 72 is increased. On the other hand, when the joint portion extends, the drag force generating member 72 contracts, and the volume of the drag force generating member 72 decreases.

Here, the drag force generating member 72 may be sealed in a state in which a fluid is enclosed therein. This restricts the expansion and contraction of the drag force generating member 72. Accordingly, the drag force generating mechanism 70 generates a drag force against an operation in which the pressing member 30 moves toward or away from the first attaching member 10 and an operation in which the pressing member 30 moves toward or away from the second attaching member 20. Thus, flexion and extension of the joint site is regulated. In this way, the drag force generating mechanism 70 can generate a drag force against the joint portion. Note that the drag force generating mechanism 70 may prevent the drag from being generated by opening the sealed state of the fluid in the drag force generating member 72. At least one of the drag force generating mechanism 70A and the drag force generating mechanism 70B may be provided. Further, in one of the drag force generating mechanisms 70 (70A or 70B), by increasing the number of the drag force generating members 72, it is possible to increase the drag force generated by the drag force generating mechanism 70.

For example, when the brace 1 is attached to the knee joint, the drag force generating mechanism 70 can suppress the knee bending. As described above, the pressing member 30 continues to press the knee joint, and thus the pressing member 30 is prevented from moving relative to the knee joint. Therefore, in the present embodiment, the drag force generated by the drag force generating mechanism 70 can be efficiently transmitted to the knee joint. Further, by increasing the drag generated by the drag force generating mechanism 70 as described above, it is possible to suppress not only sudden knee bending but also bending of the knee itself.

Embodiment 3

Next, Embodiment 3 will be described. In the brace 1 according to the third embodiment, the configuration of the third tension member 130 is different from the brace 1 according to the first embodiment and the like. Note that other configurations of the third embodiment are substantially the same as those of the first embodiment and the like, and thus description thereof will be omitted.

Figure 12:
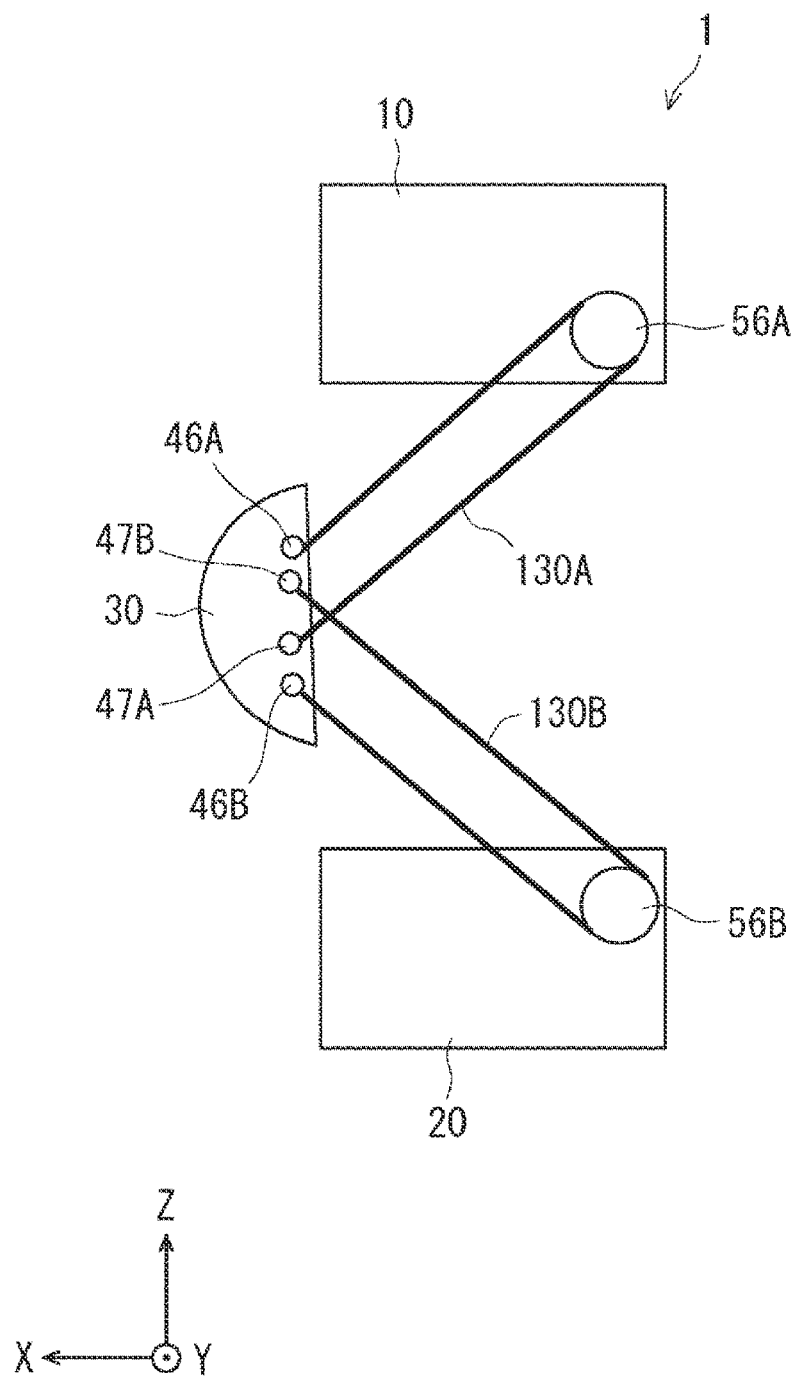
FIG. 12 is a schematic diagram showing a brace according to Embodiment 3.

FIG. 12 is a schematic diagram showing the brace 1 according to the third embodiment. The brace 1 according to the third embodiment has two third tension members 130 (130A, 130B) on the positive side (left side) of the Y-axis. A similar third tension member 130 is also provided on the negative side of the Y-axis of the brace 1. Therefore, the brace 1 according to the third embodiment has four third tension members 130.

The third tension member 130A is arranged to be folded back between the pressing member 30 and the first attaching member 10. The third tension member 130B is arranged to be folded back between the pressing member 30 and the second attaching member 20. Therefore, the third tension member 130 (130A, 130B) is arranged to fold back between the pressing member 30 and the first attaching member 10 and between the pressing member 30 and the second attaching member 20.

In FIG. 12, one end of the third tension member 130A is fixed by the fixing portion 46A at a position on the side of the first attaching member 10 (the positive side of the Z-axis) on the side surface of the pressing member 30. On the other hand, the other end of the third tension member 130A is fixed by the fixing portion 47A at the position of the side surface of the pressing member 30 on the side of the second attaching member 20 (the side on the negative Z-axis side). The third tension member 130A is disposed so as to pass through the length adjusting mechanisms 56A provided in the first attaching member 10. That is, the third tension member 130A is supported by the length adjusting mechanism 56A in the first attaching member 10. The third tension member 130A may be slidably supported by the length adjusting mechanism 56A. The length adjusting mechanism 56A functions as a transit point through which the third tension member 130A passes.

One end of the third tension member 130B is fixed by the fixing portion 46B at a position on the side of the second attaching member 20 (the negative side of the Z-axis) on the side surface of the pressing member 30. On the other hand, the other end of the third tension member 130B is fixed by the fixing portion 47B at the position of the side surface of the pressing member 30 on the side of the first attaching member 10 (the positive side of the Z-axis). The third tension member 130B is disposed so as to pass through the length adjusting mechanisms 56B provided in the second attaching member 20. That is, the third tension member 130B is supported by the length adjusting mechanism 56B in the second attaching member 20. The third tension member 130B may be slidably supported by the length adjusting mechanism 56B. The length adjusting mechanism 56B functions as a transit point through which the third tension member 130B passes.

The length adjusting mechanism 56A is provided at a position on the rear side (the negative side of the X-axis) of the first attaching member 10. The length adjusting mechanism 56B is provided at a position on the rear side (the negative side of the X-axis) of the second attaching member 20. The length adjusting mechanism 56A includes a mechanism for winding or rewinding the third tension member 130A. The length adjusting mechanism 56B includes a mechanism for winding or rewinding the third tension member 130B. Accordingly, the length adjusting mechanism 56A, 56B functions as an adjusting mechanism for adjusting the length of the third tension member 130.

Figure 13:
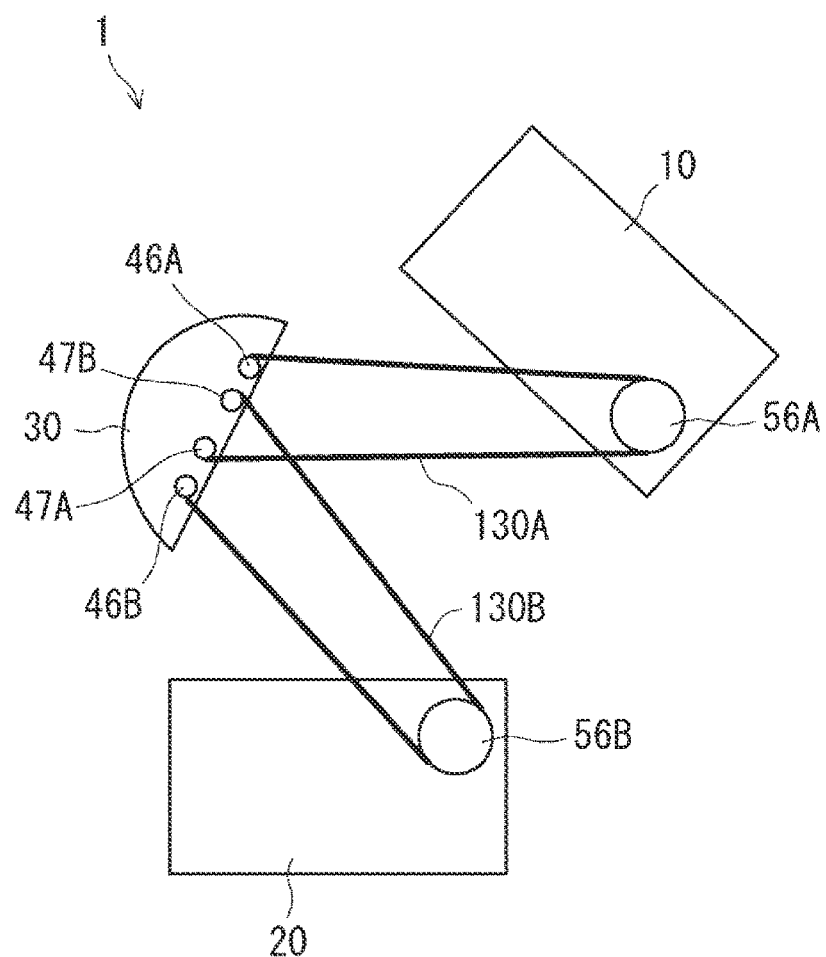
FIG. 13 is a diagram illustrating the behavior of each of the third tension members when the joint portion is bent in a state where the brace according to the third embodiment is attached to the joint portion.

FIG. 13 is a diagram illustrating the behavior of each of the third tension member 130A, 130B when the joint portion is bent with the brace 1 according to the third embodiment attached to the joint portion. As in the state of FIG. 9, as the joint portion bends, as shown in FIG. 13, the first attaching member 10 rotates around the Y-axis toward the side in the negative direction of the X-axis as viewed from the second attaching member 20. As described above, when the joint portion is bent, the front side (the side in the positive direction of the X-axis) of the joint portion is extended and the rear side (the side in the negative direction of the X-axis) is contracted. In this case, the distance between the length adjusting mechanism 56A and the length adjusting mechanism 56B is reduced.

Then, as in the first embodiment, the fixing portion 46A, 47A and the length adjusting mechanism 56A are arranged so that the variation of the path length of the third tension member 130A is equal to or smaller than the predetermined threshold Th3a. Similarly, the fixing portion 46B, 47B and the length adjusting mechanism 56B are arranged so that the variation of the path length of the third tension member 130B is equal to or smaller than the predetermined threshold Th3b. The threshold Th3a may be the same as or different from the threshold Th3b.

The third tension member 130 (130A, 130B) according to the third embodiment is also arranged so as to be folded back between the pressing member 30 and the first attaching member 10 and between the pressing member 30 and the second attaching member 20. Therefore, as described above in the first embodiment, it is possible to suppress the influence of the change in the path length of the third tension member 130 on the pressing member 30. Therefore, also in the third tension member 130 according to the third embodiment, the relative positions of the pressing member 30 with respect to the first attaching member 10 and the second attaching member 20 can be made appropriate.

Embodiment 4

Next, Embodiment 4 will be described. In the brace 1 according to the fourth embodiment, the configuration of the tension member 100 is different from the brace 1 according to the first embodiment and the like. Note that other configurations of the fourth embodiment are substantially the same as those of the first embodiment and the like, and thus description thereof will be omitted.

Figure 14:
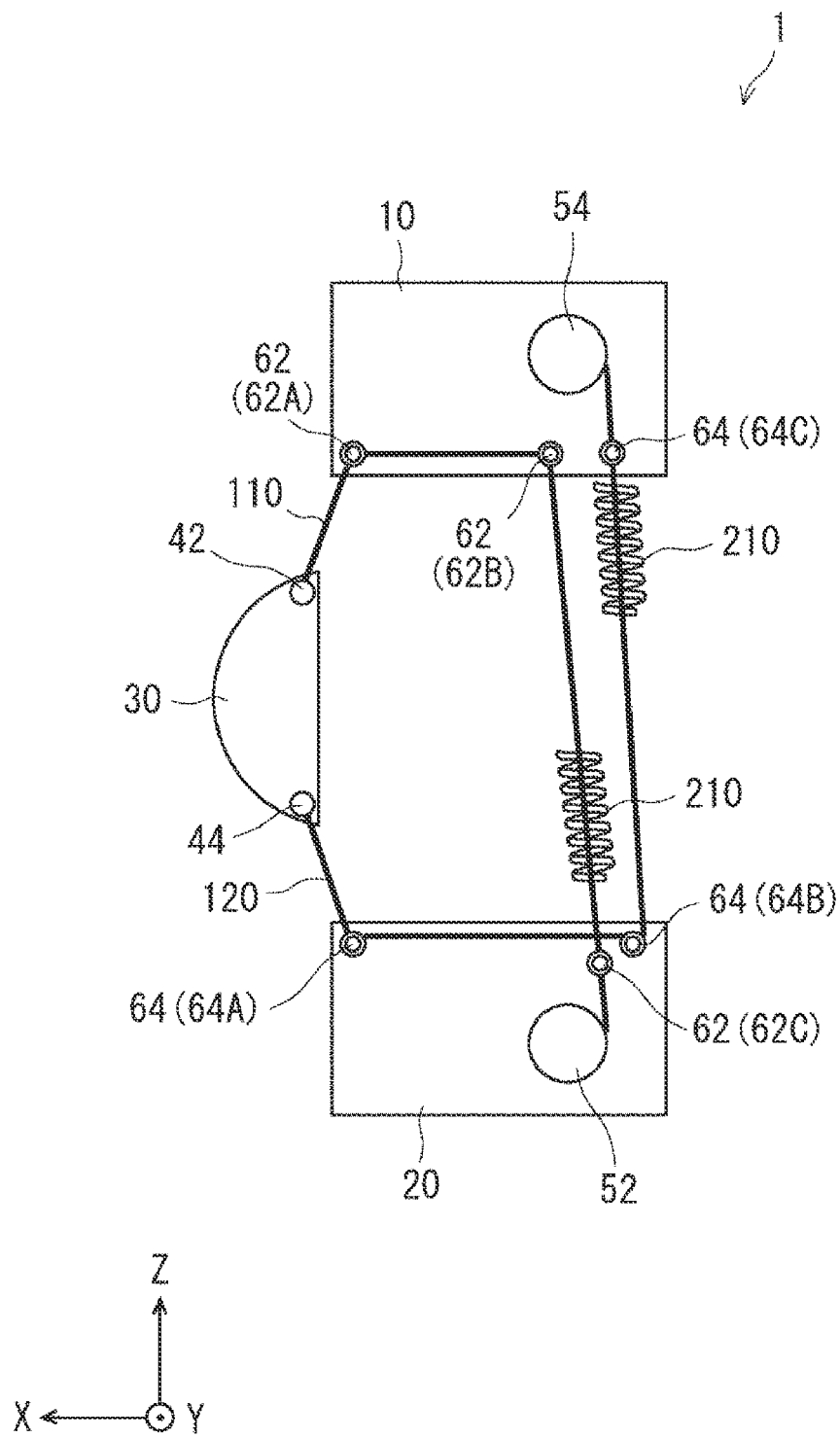
FIG. 14 is a schematic diagram showing a brace according to Embodiment 4.

FIG. 14 is a schematic diagram showing the brace 1 according to the fourth embodiment. FIG. 14 corresponds to FIG. 3. The tension member 100 (the first tension member 110 and the second tension member 120) has an elastic member 210 in the middle thereof. In FIG. 14, only the first tension member 110 and the second tension member 120 have the elastic member 210, but the third tension member 130 may also have the elastic member 210. The elastic member 210 may be constituted by, for example, a spring element.

The elastic member 210 can absorb individual differences between users when the brace 1 is worn by a plurality of different users. That is, since the size of the joint portion differs for each user, when the same brace 1 is worn by a plurality of users, adjustment by a length adjusting mechanism or the like may become complicated. On the other hand, since the elastic member 210 is provided in the tension member 100, it is possible to reduce the complexity of adjustment when the brace 1 is worn by different users.

As described above, it is desirable that the amount of change in the path length of the tension member 100 is small. The amount of change in the length of the elastic member 210 is also desirably small. Therefore, the elastic modulus of the elastic member 210 needs to be large enough that the elastic force is not smaller than the force that the pressing member 30 presses the joint portion.

Embodiment 5

Next, Embodiment 5 will be described. The brace 1 according to the fifth embodiment differs from the brace 1 according to the first embodiment and the like in the configuration of the passing point (support mechanism or the like). Note that other configurations of the fifth embodiment are substantially the same as those of the first embodiment and the like, and thus description thereof will be omitted. One or more of the passing points according to embodiment 5 may be moved by a moving mechanism. That is, the brace 1 according to the fifth embodiment has a moving mechanism configured to move a passing point through which the tension member 100 passes.

Figure 15:
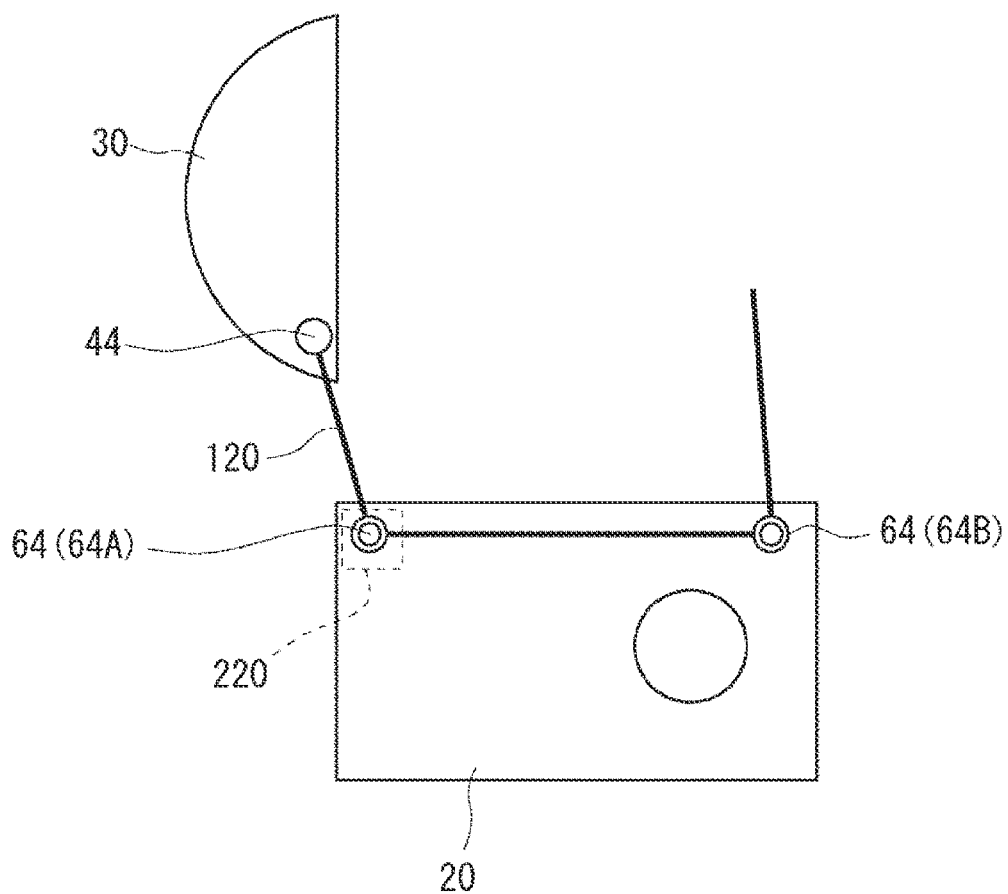
FIG. 15 is a diagram illustrating a moving mechanism according to a first example of Embodiment 5.
Figure 16:
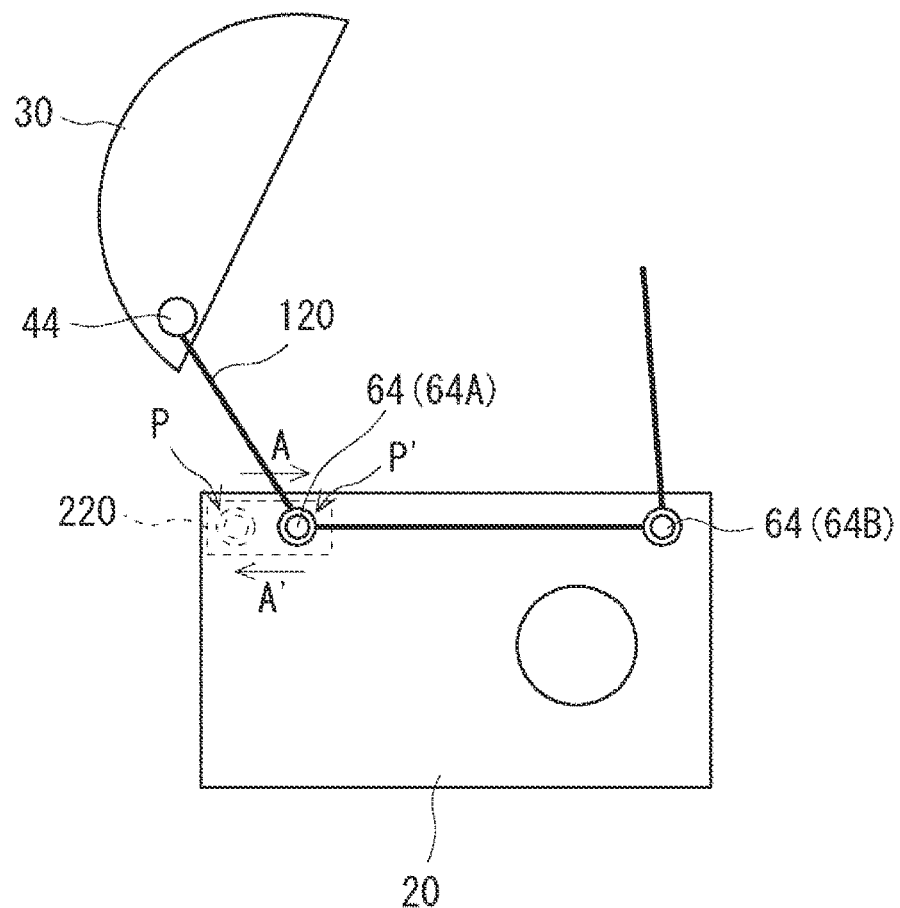
FIG. 16 is a diagram illustrating a moving mechanism according to a first example of Embodiment 5.

FIG. 15 and FIG. 16 are diagrams illustrating a moving mechanism 220 according to a first example of the fifth embodiment. In FIG. 15 and FIG. 16, only the negative side (lower side) of the Z-axis of the brace 1 is depicted. The second attaching member 20 is provided with a moving mechanism 220. That is, the brace 1 has a moving mechanism 220.

The moving mechanism 220 is configured to move the support mechanism 64A, which is a passing point through which the second tension member 120 passes. Specifically, when the joint portion is bent with the brace 1 attached to the joint portion, the moving mechanism 220 moves (slides) the support mechanism 64A from the position of the point P to the position of the point P', as indicated by an arrow A in FIG. 16.

The moving mechanism 220 can absorb individual differences between users when the brace 1 is worn by a plurality of different users. That is, since the size of the joint portion differs for each user, when the same brace 1 is worn by a plurality of users, adjustment by a length adjusting mechanism or the like may become complicated. On the other hand, by moving the support mechanism (passing point) by the moving mechanism 220, it is possible to reduce the complexity of adjustment when the brace 1 is worn by different users.

As described above, it is desirable that the amount of change in the path length of the tension member 100 is small. Therefore, it is necessary to return the path of the second tension member 120 to the original path. Accordingly, as indicated by the arrow A' in FIG. 16, the moving mechanism 220 generates a restoring force to return the support mechanism 64A from the position of the point P' to the position of the original point P. The restoring force needs to be large enough not to be smaller than the force that the pressing member 30 presses the joint portion. For example, a restoring force may be generated by biasing the support mechanism 64A in A' of the arrow by a spring element.

Note that the moving mechanism 220 may move an arbitrary passing point. For example, the moving mechanism 220 may move the support mechanism 64B. The moving mechanism 220 may be provided on the first attaching member 10 to move the support mechanism 62C. The moving mechanism 220 may also move one or more of the support mechanisms 62. The moving mechanism 220 may be provided on the pressing member 30 to move one or more of the support mechanisms 66. In addition, the moving mechanism 220 may move the fixing portion or the length adjusting mechanism. The same applies to the moving mechanism 230 described later.

Figure 17:
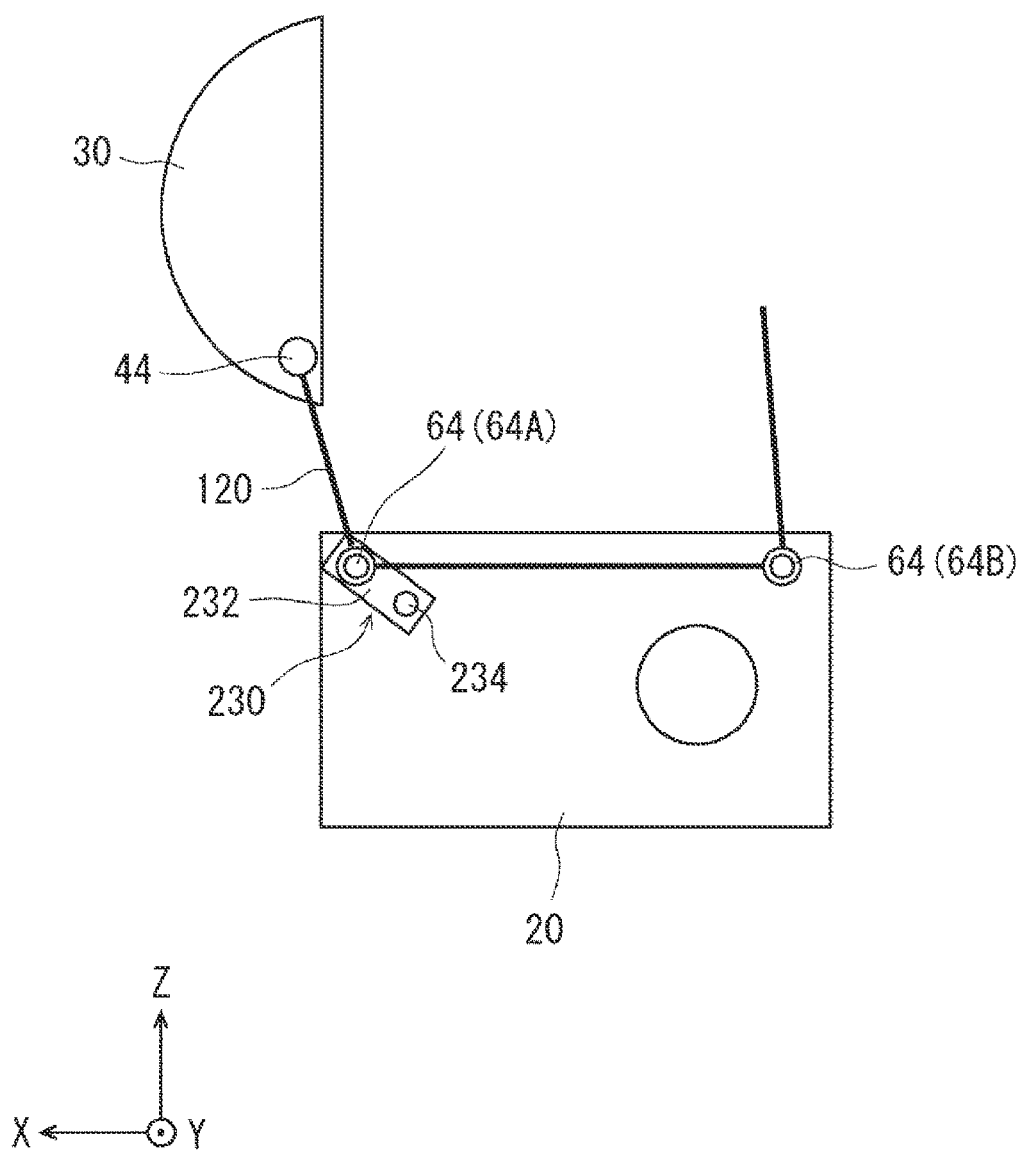
FIG. 17 is a diagram illustrating a moving mechanism according to a second example of Embodiment 5.
Figure 18:
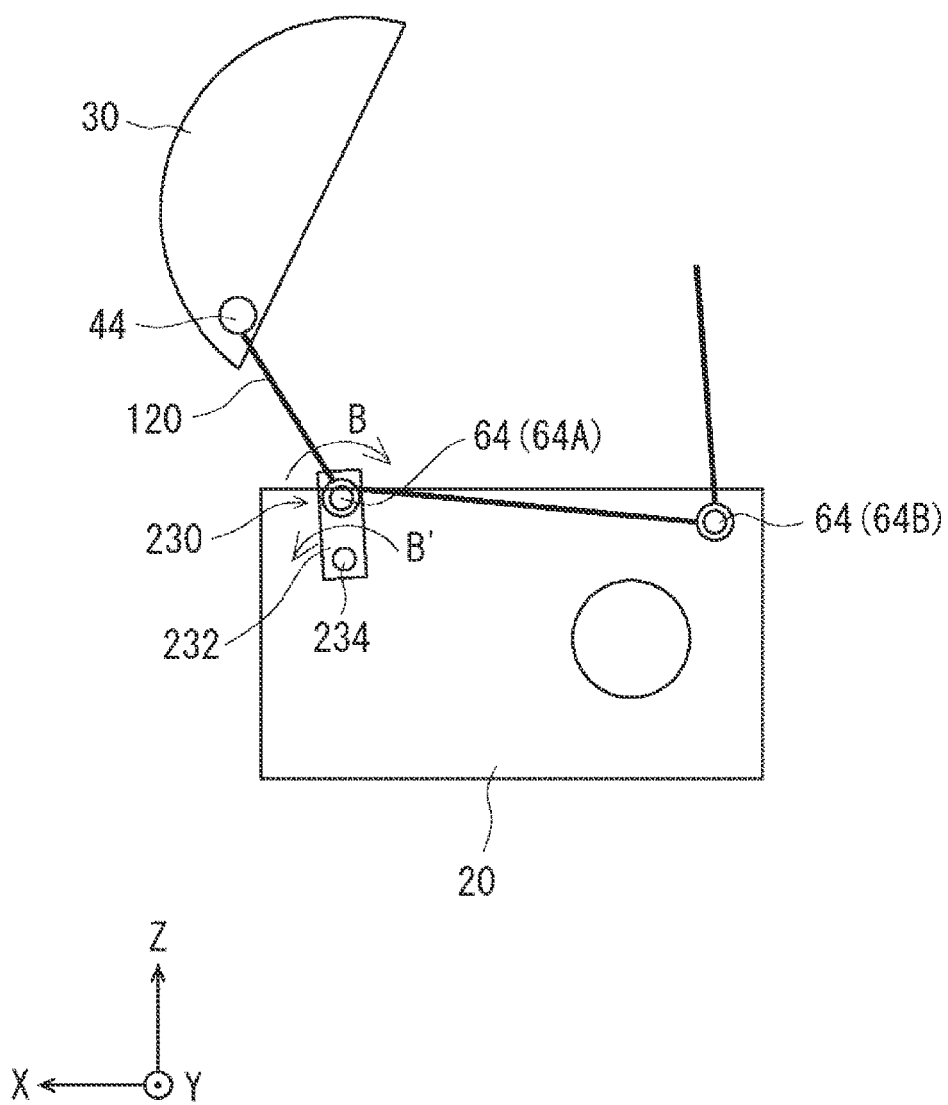
FIG. 18 is a diagram illustrating a moving mechanism according to a second example of Embodiment 5.

FIG. 17 and FIG. 18 are diagrams illustrating a moving mechanism 230 according to a second example of the fifth embodiment. In FIG. 17 and FIG. 18, only the negative side (lower side) of the Z-axis of the brace 1 is depicted. The second attaching member 20 is provided with a moving mechanism 230. That is, the brace 1 has a moving mechanism 230.

The moving mechanism 230 is configured to move the support mechanism 64A, which is a passing point through which the second tension member 120 passes. Specifically, the moving mechanism 230 includes, for example, a link member 232 formed in a plate shape and a rotation shaft 234. The rotation shaft 234 is supported by the second attaching member 20. The link member 232 is rotatably supported by the rotation shaft 234. A support mechanism 64A is provided in the vicinity of the distal end of the link member 232. When the joint portion is bent with the brace 1 attached to the joint portion, the moving mechanism 230 moves the support mechanism 64A so as to rotate about the rotation shaft 234, as indicated by an arrow B in FIG. 18.

The moving mechanism 230 can absorb individual differences between users when the brace 1 is worn by a plurality of different users. That is, since the size of the joint portion differs for each user, when the same brace 1 is worn by a plurality of users, adjustment by a length adjusting mechanism or the like may become complicated. On the other hand, by moving the support mechanism (passing point) by the moving mechanism 230, it is possible to reduce the complexity of adjustment when the brace 1 is worn by different users.

As described above, it is desirable that the amount of change in the path length of the tension member 100 is small. Therefore, it is necessary to return the path of the second tension member 120 to the original path. Accordingly, as indicated by the arrow B' in FIG. 18, the moving mechanism 230 generates a restoring force to return the support mechanism 64A to its original position. The restoring force needs to be large enough not to be smaller than the force that the pressing member 30 presses the joint portion. For example, a restoring force may be generated by biasing the support mechanism 64A in B' of the arrow by a spring element.

Embodiment 6

Next, Embodiment 6 will be described. The brace 1 according to the sixth embodiment is different from the brace 1 according to the first embodiment and the like in that it has a restricting mechanism 300. Note that other configurations of the sixth embodiment are substantially the same as those of the first embodiment and the like, and thus description thereof will be omitted.

Figure 19:
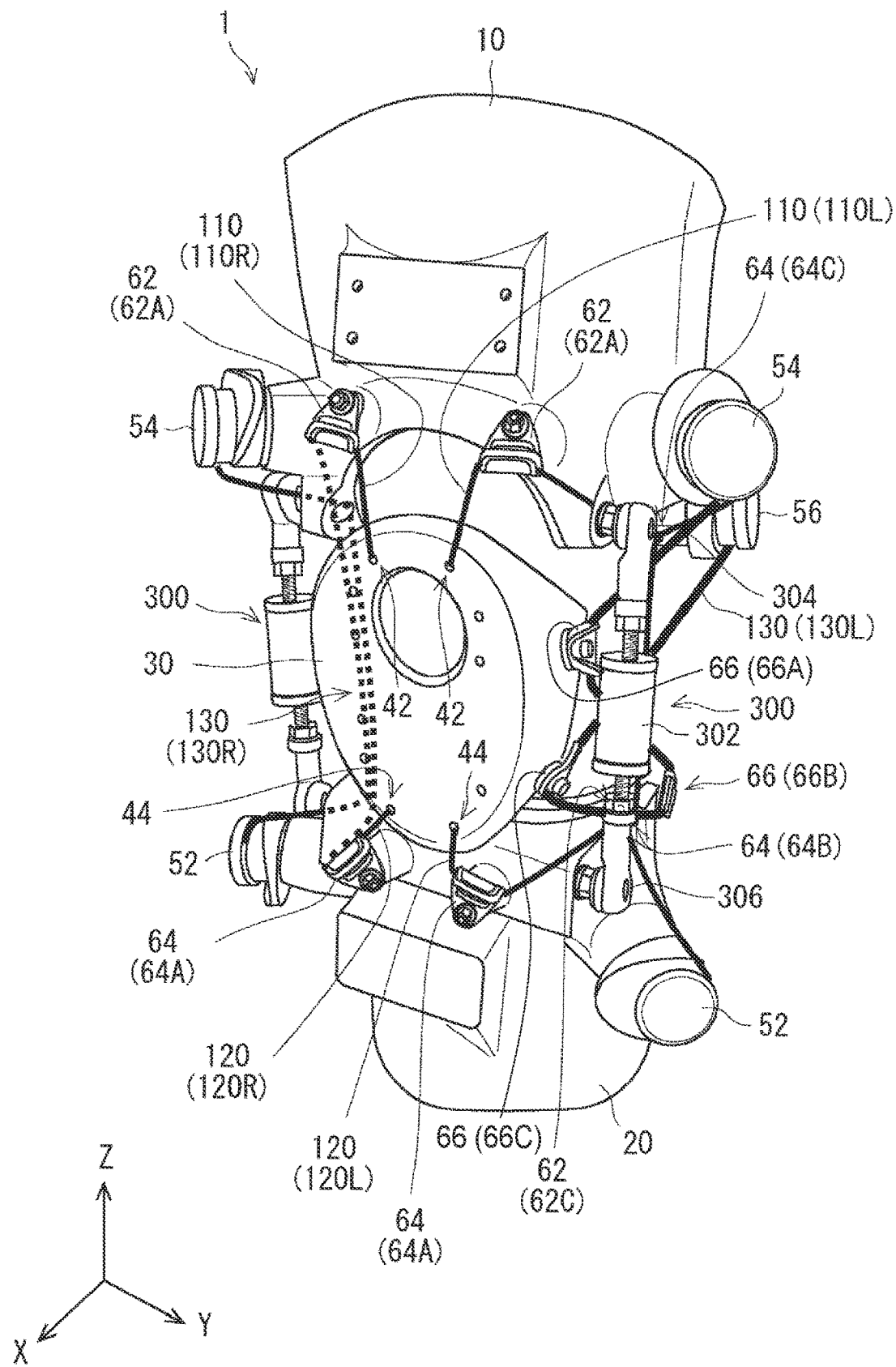
FIG. 19 is a diagram illustrating a brace according to Embodiment 6.
Figure 20:
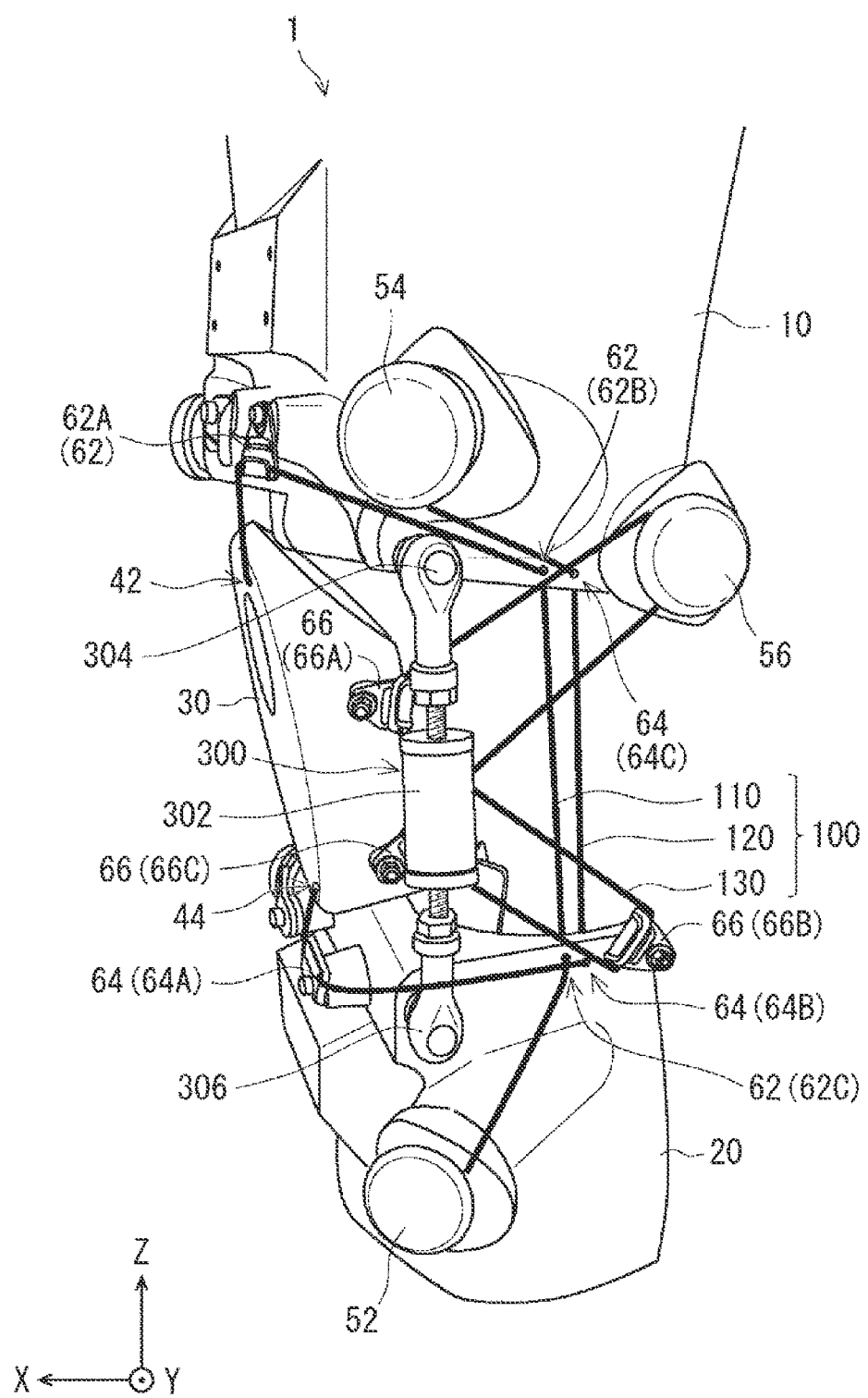
FIG. 20 is a diagram illustrating a brace according to Embodiment 6.

FIG. 19 and FIG. 20 are diagrams illustrating the brace 1 according to the sixth embodiment. FIG. 19 corresponds to FIG. 1 described above. FIG. 20 corresponds to FIG. 2 described above. The brace 1 according to the sixth embodiment includes a restricting mechanism 300 between the first attaching member 10 and the second attaching member 20. The restricting mechanism 300 includes an elastic member 302 and connecting members 304,306 provided on both sides of the elastic member 302.

The connecting member 304 is connected to the positive side (front side) of the X-axis of the first attaching member 10. Further, the connecting member 306 is connected to the positive side (front side) of the X-axis of the second attaching member 20. The elastic member 302 is constituted by a spring element. The elastic modulus of the elastic member 302 is small enough not to interfere with the flexion and extension movement of the joint portion.

The restricting mechanism 300 is configured to restrict a decrease in a distance between the first attaching member 10 and the second attaching member 20. Therefore, the relative distance between the first attaching member 10 and the second attaching member 20 is more reliably maintained by the restricting mechanism 300. That is, when the joint portion expands and the elastic member 302 contracts to the maximum, the distance between the first attaching member 10 and the second attaching member 20 is restricted by the restricting mechanism 300. Here, if the tension member 100 is too wound by the length adjusting mechanism, the tension of the tension member 100 may be too strong, and the tension member 100 may reduce the distance between the first attaching member 10 and the second attaching member 20. In this case, the first attaching member 10 and the second attaching member 20 may be detached from the joint portion. On the other hand, by providing the restricting mechanism 300, it is restricted that the distance between the first attaching member 10 and the second attaching member 20 is reduced even when the tension member 100 is excessively wound up by the length adjusting mechanism. Therefore, it is possible to prevent the first attaching member 10 and the second attaching member 20 from being detached from the joint portion.

However, proper placement of the tension member 100 and the passing point results in proper tension of the tension member 100. This makes it possible to maintain the relative distance between the first attaching member 10 and the second attaching member 20 even without the restricting mechanism 300. Therefore, the restricting mechanism 300 is not an essential component in the present embodiment.

On the other hand, by providing the drag force generating mechanism 70 according to the second embodiment between the first attaching member 10 and the pressing member 30, a force may be generated in a direction in which the distance between the first attaching member 10 and the pressing member 30 decreases. Similarly, by providing the drag force generating mechanism 70 according to the second embodiment between the second attaching member 20 and the pressing member 30, a force may be generated in a direction in which the distance between the second attaching member 20 and the pressing member 30 decreases. Therefore, by providing the brace 1 with the drag force generating mechanism 70 according to the second embodiment, a force may be generated in a direction in which the distance between the first attaching member 10 and the second attaching member 20 decreases. Therefore, since the brace 1 has both the drag force generating mechanism 70 and the restricting mechanism 300, it is possible to prevent the first attaching member 10 and the second attaching member 20 from being detached from the joint portion due to the drag generated by the drag force generating mechanism 70. That is, it is possible to prevent the first attaching member 10 and the second attaching member 20 from being detached from the joint portion while generating a drag force at the joint portion.

Modification

Note that the present disclosure is not limited to the above embodiment, and can be appropriately modified without departing from the spirit. For example, the above-described embodiments are applicable to each other. For example, the configuration according to the second embodiment is also applicable to the third and subsequent embodiments.

Further, the arrangement of the first tension member 110, the second tension member 120, and the third tension member 130 is not limited to the configuration of the above-described embodiment. The number of the first tension member 110, the second tension member 120, and the third tension member 130 is not limited to that shown in the above-described embodiment. In the above-described embodiment, the number of the first tension members 110 is two, the number of the second tension members 120 is two, and the number of the third tension members 130 is two or four. If the relative positions of the pressing member 30 and the first attaching member 10 and the second attaching member 20 can be determined by the tension of the tension member 100, the arrangement and the number of the tension members 100 are arbitrary.

Further, the brace 1 according to the present embodiment may not be a single apparatus. For example, the brace 1 according to the present embodiment may be integrated with clothing. When the brace 1 is attached to the knee joint, the brace 1 may be integral with a point corresponding to the knee portion of the pants.

In addition, in the brace 1 according to the third embodiment shown in FIGS. 12 and 13, the support mechanism 60 is not provided as a point through which the third tension member 130A passes. However, even in the third embodiment, the third tension member 130A may be supported by the support mechanism 60, and the third tension member 130 may slide on the support mechanism 60. For example, as the first case, the support mechanism 60 may be provided in at least one of the first attaching member 10 and the pressing member 30. The third tension member 130A may be slidably supported between the fixing portion 46A and the length adjusting mechanism 56A and between the fixing portion 47A and the length adjusting mechanism 56A by the support mechanism 60. Alternatively, as the second case, the support mechanism 60 may be provided in place of the fixing portion 46A and the fixing portion 47A at a position where the fixing portion 46A and the fixing portion 47A are provided. Both ends of the third tension member 130A may be fixed by the length adjusting mechanism 56. Further, the third tension member 130A may be arranged to be looped by the support mechanisms 60 provided instead of the positions of the fixing portion 46A and the fixing portion 47A. The third tension member 130 may be slidably supported by the support mechanism 60 provided in the pressing member 30. According to the above-described configuration, the third tension member 130A does not need to be configured to slide in the length adjusting device. In addition, the above two cases may be combined. The same applies to the third tension member 130B.

Further, the restricting mechanism 300 according to the sixth embodiment may have any shape as long as it can restrict the reduction of the distance between the first attaching member 10 and the second attaching member 20. For example, the restricting mechanism 300 illustrated in FIGS. 19 and 20 includes the elastic member 302, but is not limited to such a configuration. The restricting mechanism 300 may be physically provided separately from the first attaching member 10 and the second attaching member 20. In this case, the distance between the first attaching member 10 and the second attaching member 20 can be restricted from decreasing due to the abutment of the restricting mechanism 300 separately provided on the first attaching member 10 and the second attaching member 20 against each other. In this case, the restricting mechanism 300 may be physically integrally formed with the first attaching member 10 and the second attaching member 20.

What is claimed is:

1. A brace configured to be attached to a body, the brace comprising:
a first cuff configured to be fixed to a central portion of the body on a joint portion to which the brace is attached;
a second cuff configured to be fixed to a portion opposite to the central portion of the body on the joint portion;
a plate configured to apply pressure to a portion of the joint portion that extends when the joint portion is bent; and
a plurality of connectors configured to pull and connect the first cuff, the second cuff, and the plate, wherein each of the connectors is disposed such that a change in length of each of the connectors when the joint portion is bent and extended is equal to or less than a predetermined threshold value;
wherein the connectors are at least one of a thread, a wire, a belt, or a ribbon, and
the connectors are configured to include:
a first connector of which one end is fixed to the plate on a first cuff side and of which another end is fixed to the second cuff such that the first connector passes through the first cuff; and
a second connector of which one end is fixed to the plate on a second cuff side and of which another end is fixed to the first cuff such that the second connector passes through the second cuff.

2. The brace according to claim 1, wherein:
the first connector is disposed so as to pass through the first cuff by a first slider that is provided on the first cuff and that supports the first connector such that the first connector is able to slide; and
the second connector is disposed so as to pass through the second cuff by a second slider that is provided on the second cuff and that supports the second connector such that the second connector is able to slide.

3. The brace according to claim 1, wherein the connectors include at least one third connector disposed to fold back between the plate and the first cuff, and between the plate and the second cuff.

4. The brace according to claim 1, further comprising a pipe configured to hold liquid that is provided at least one of a position between the first cuff and the plate and a position between the second cuff and the plate, and that is configured to generate a drag force against an operation in which the plate moves toward or away from the first cuff and an operation in which the plate moves toward or away from the second cuff.

5. The brace according to claim 4, further comprising a spacer configured to restrict reduction of a distance between the first cuff and the second cuff.

6. The brace according to claim 1, further comprising a fastener configured to fasten each of the connectors in a different location according to a preference of a user.

7. The brace according to claim 1, wherein each of the connectors is provided with an elastic member.

* * * * *